June 7, 1932.    F. M. CARROLL    1,862,004
SUBTRACTING TABULATOR
Filed Feb. 4, 1927    14 Sheets-Sheet 1
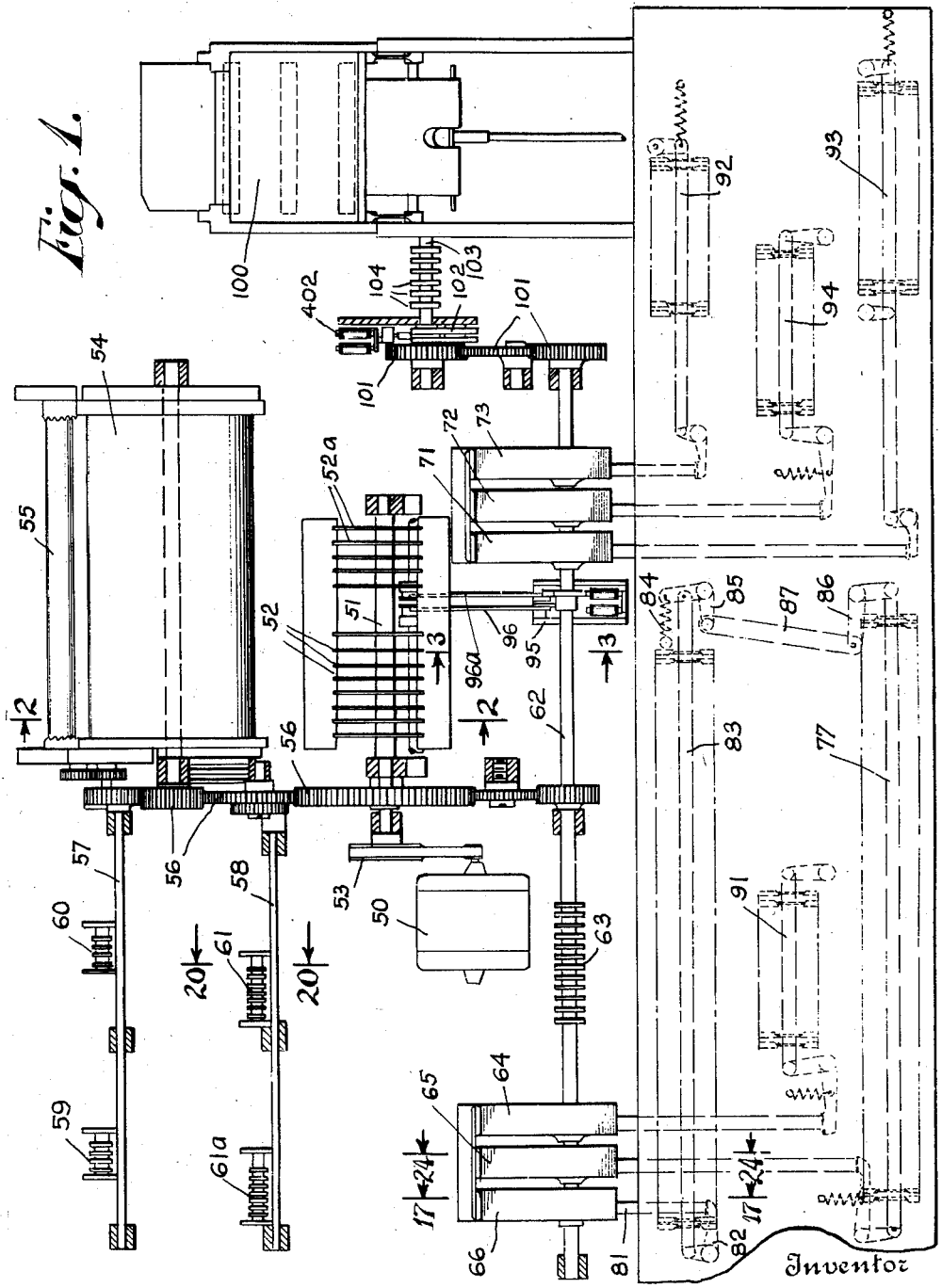
Inventor
FRED M. CARROLL
By his Attorney

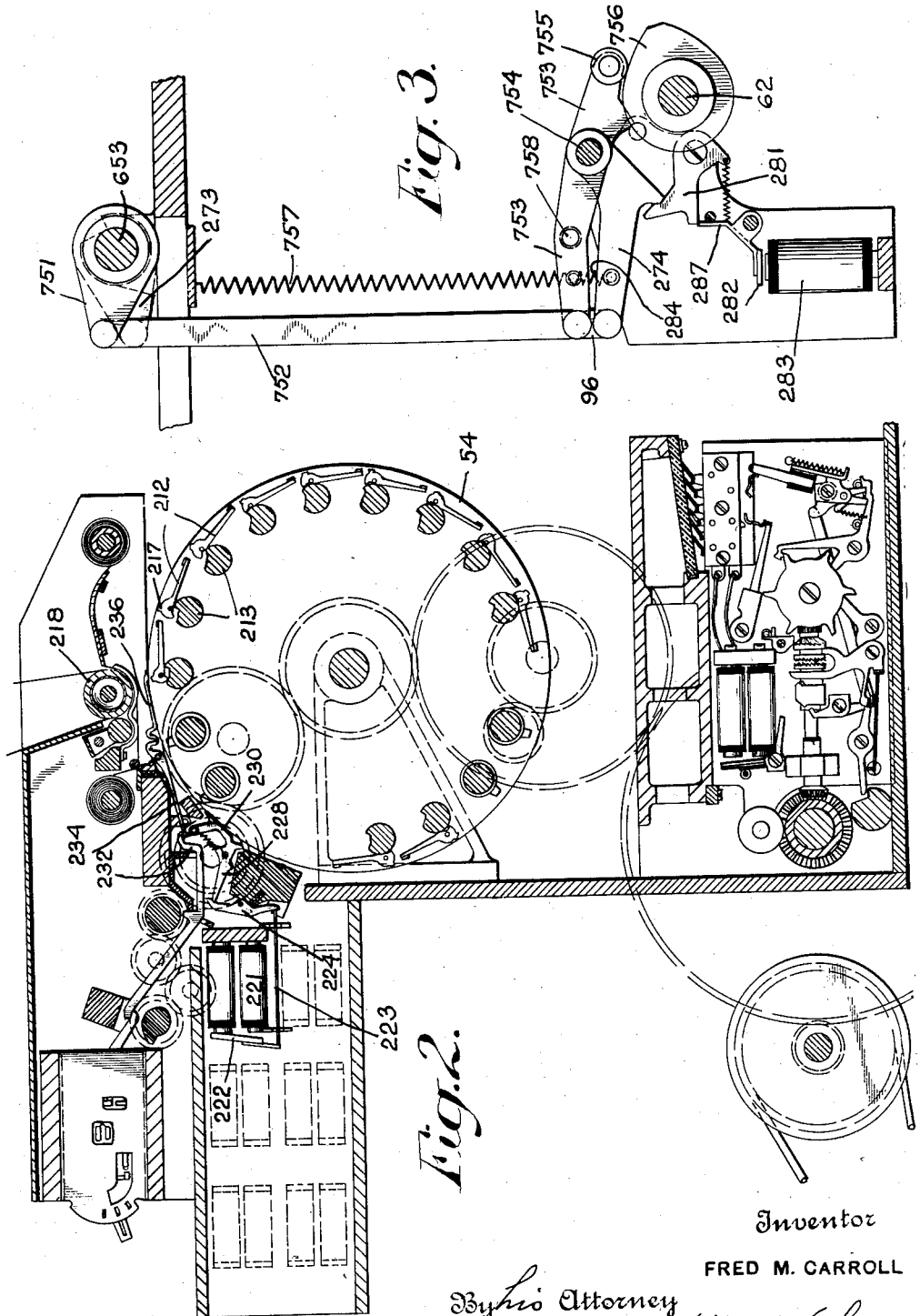

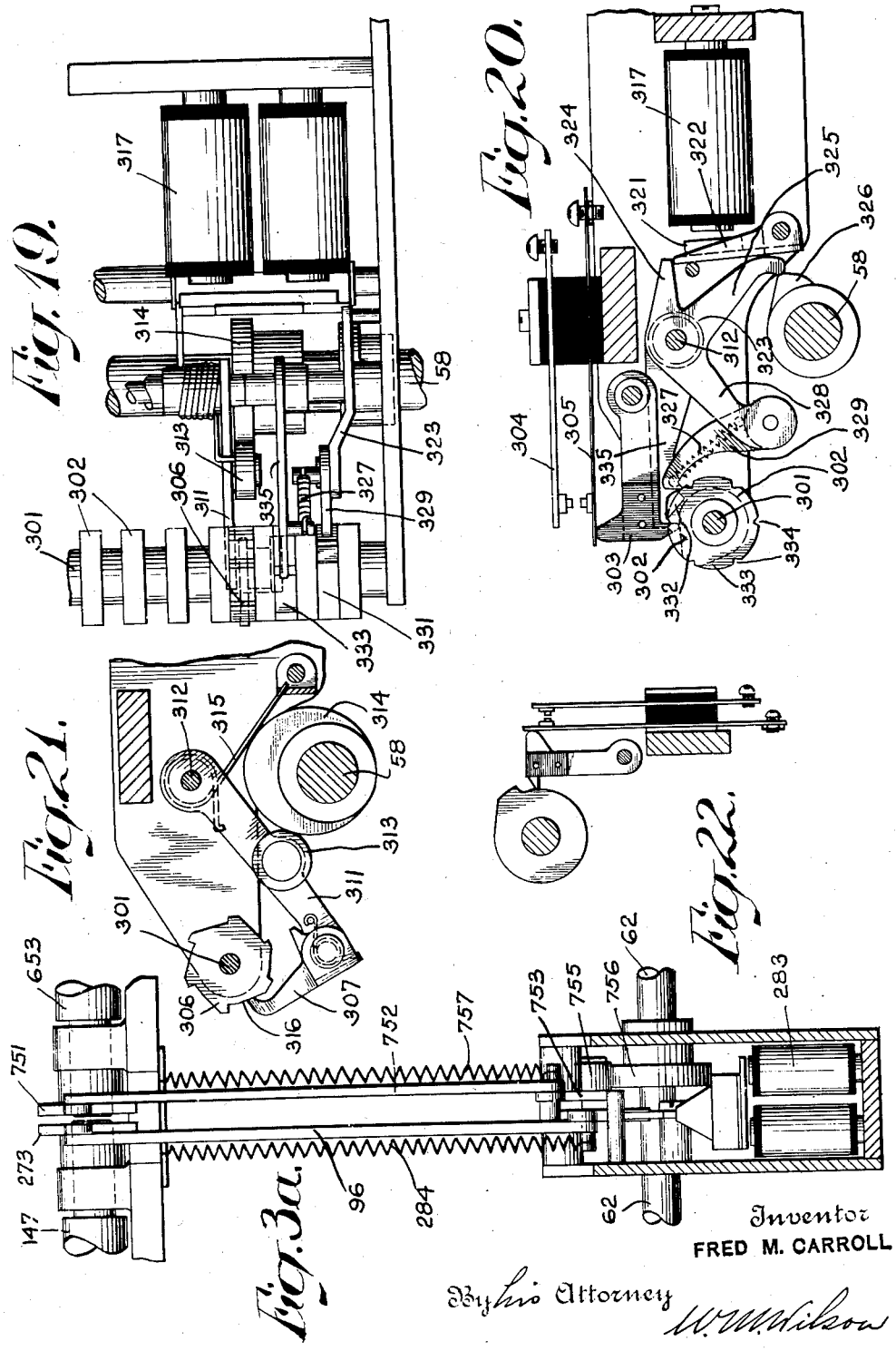
June 7, 1932.  F. M. CARROLL  1,862,004
SUBTRACTING TABULATOR
Filed Feb. 4, 1927  14 Sheets-Sheet 3
Inventor
FRED M. CARROLL
By his Attorney
W. M. Wilson

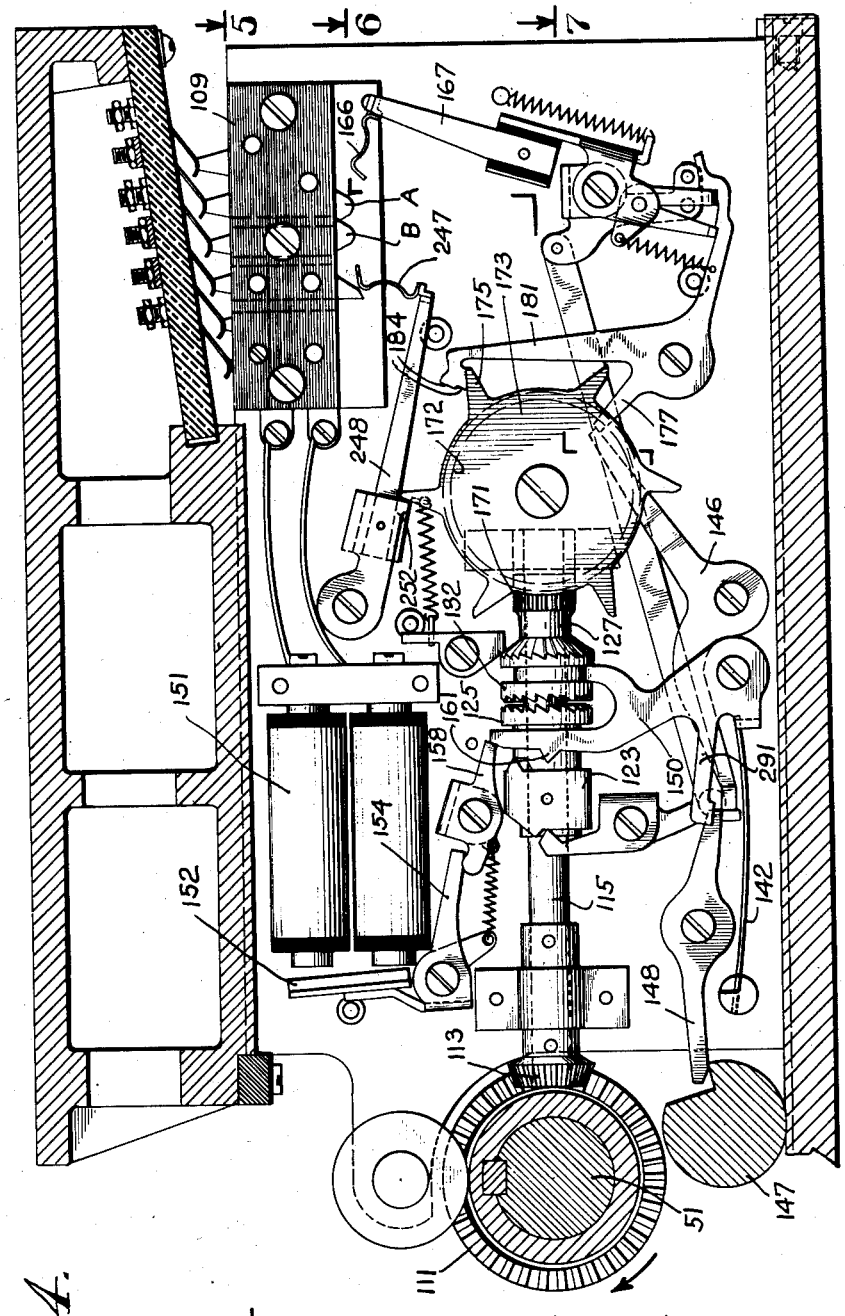

June 7, 1932.  F. M. CARROLL  1,862,004
SUBTRACTING TABULATOR
Filed Feb. 4, 1927    14 Sheets-Sheet 5
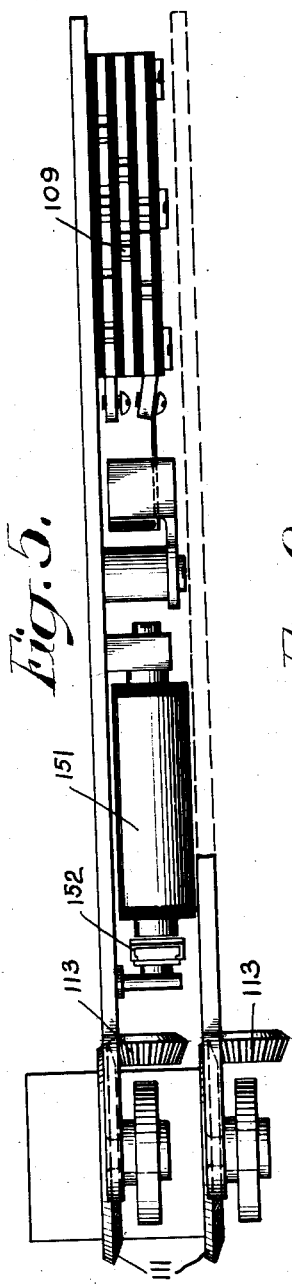
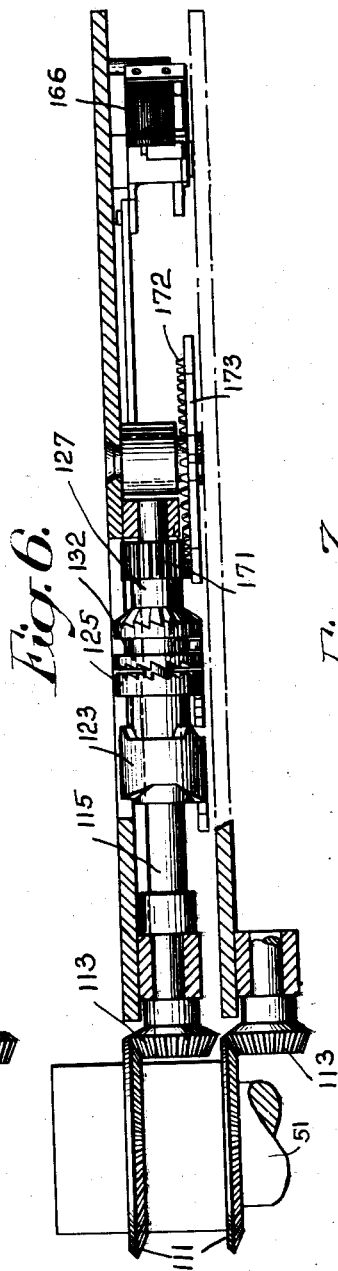
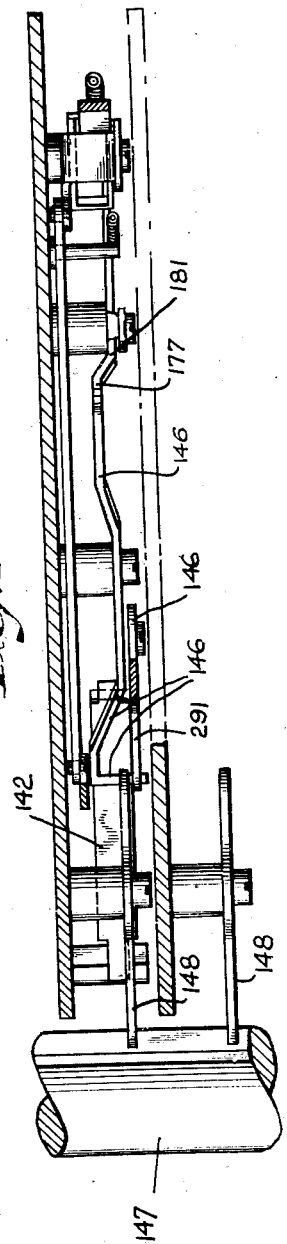
Inventor
FRED M. CARROLL June 7, 1932.  F. M. CARROLL  1,862,004
SUBTRACTING TABULATOR
Filed Feb. 4, 1927   14 Sheets-Sheet 6

Inventor
FRED M. CARROLL
By his Attorney

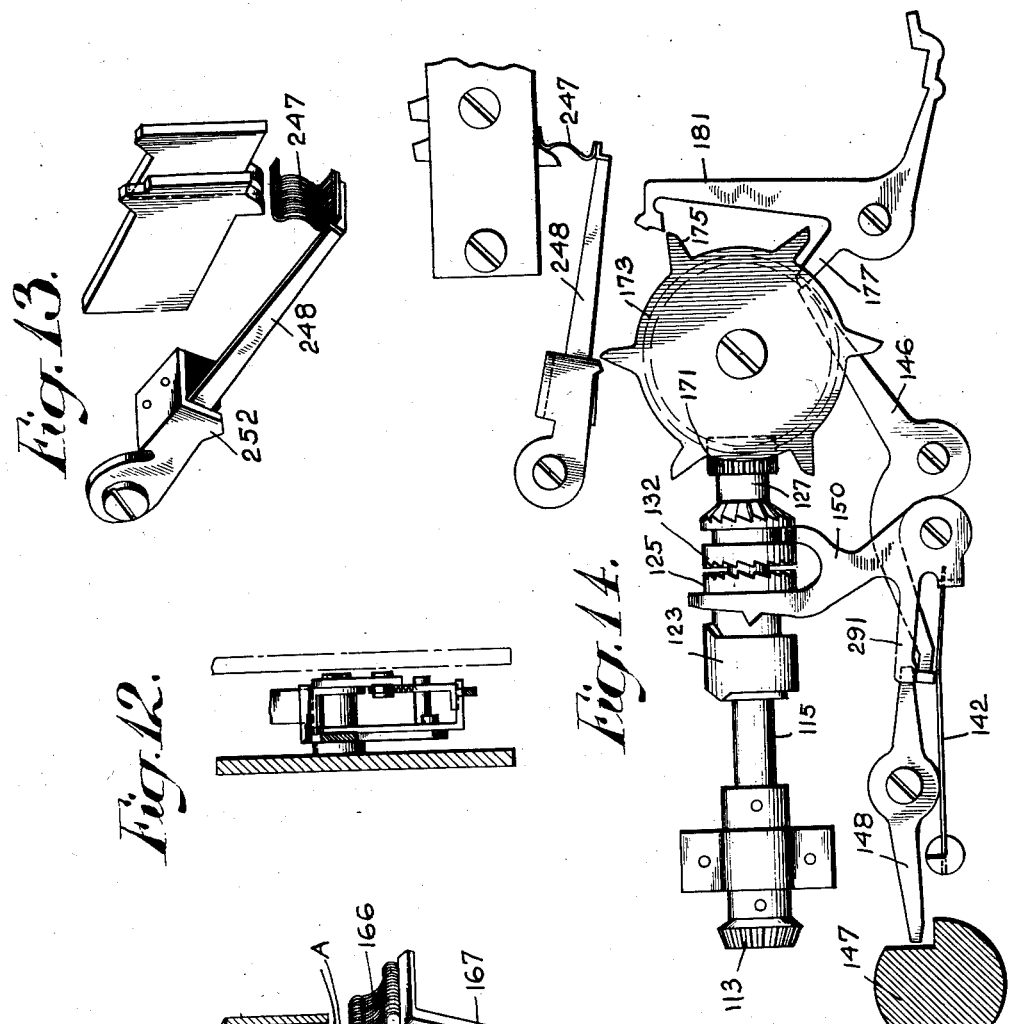

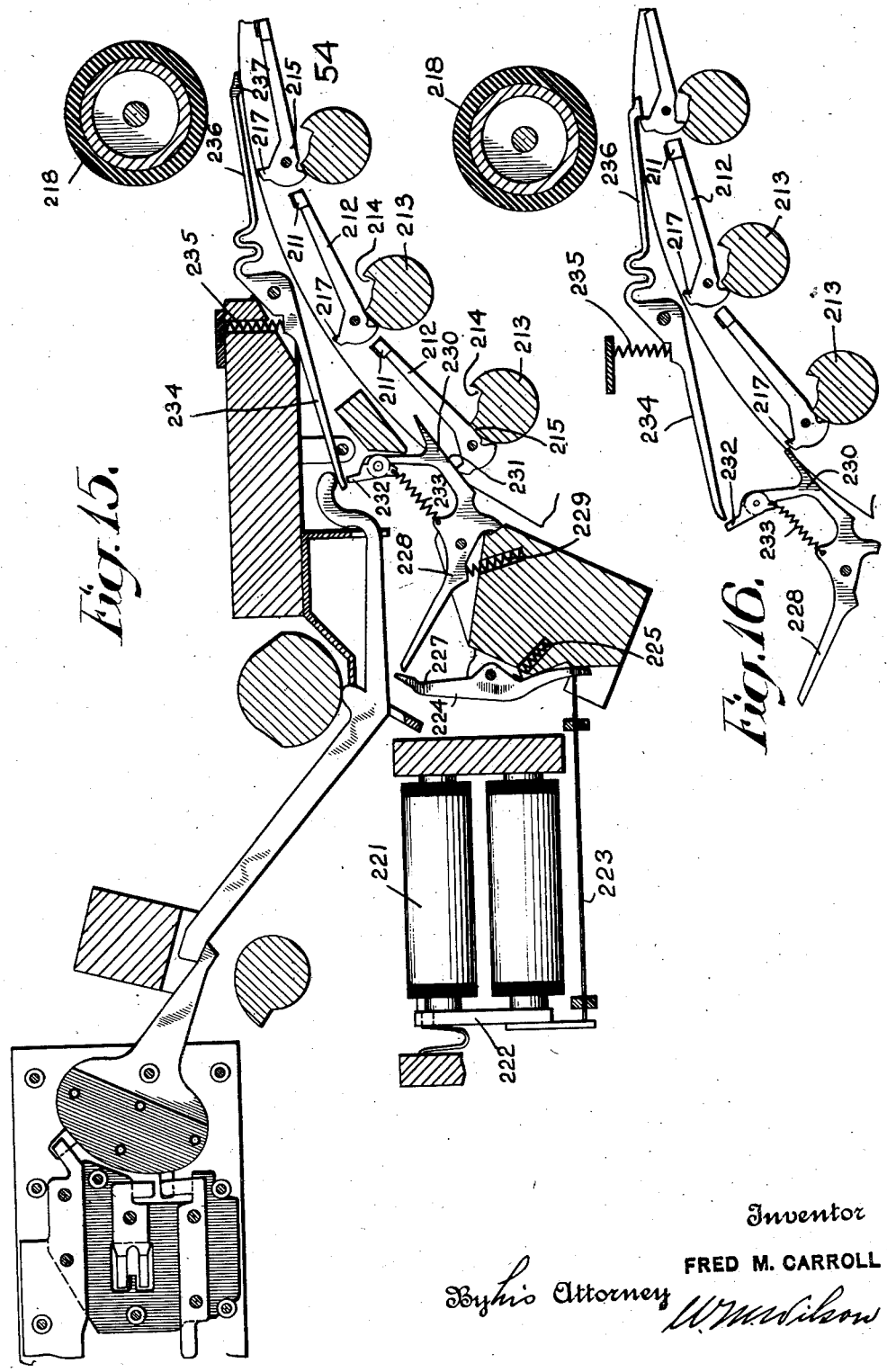

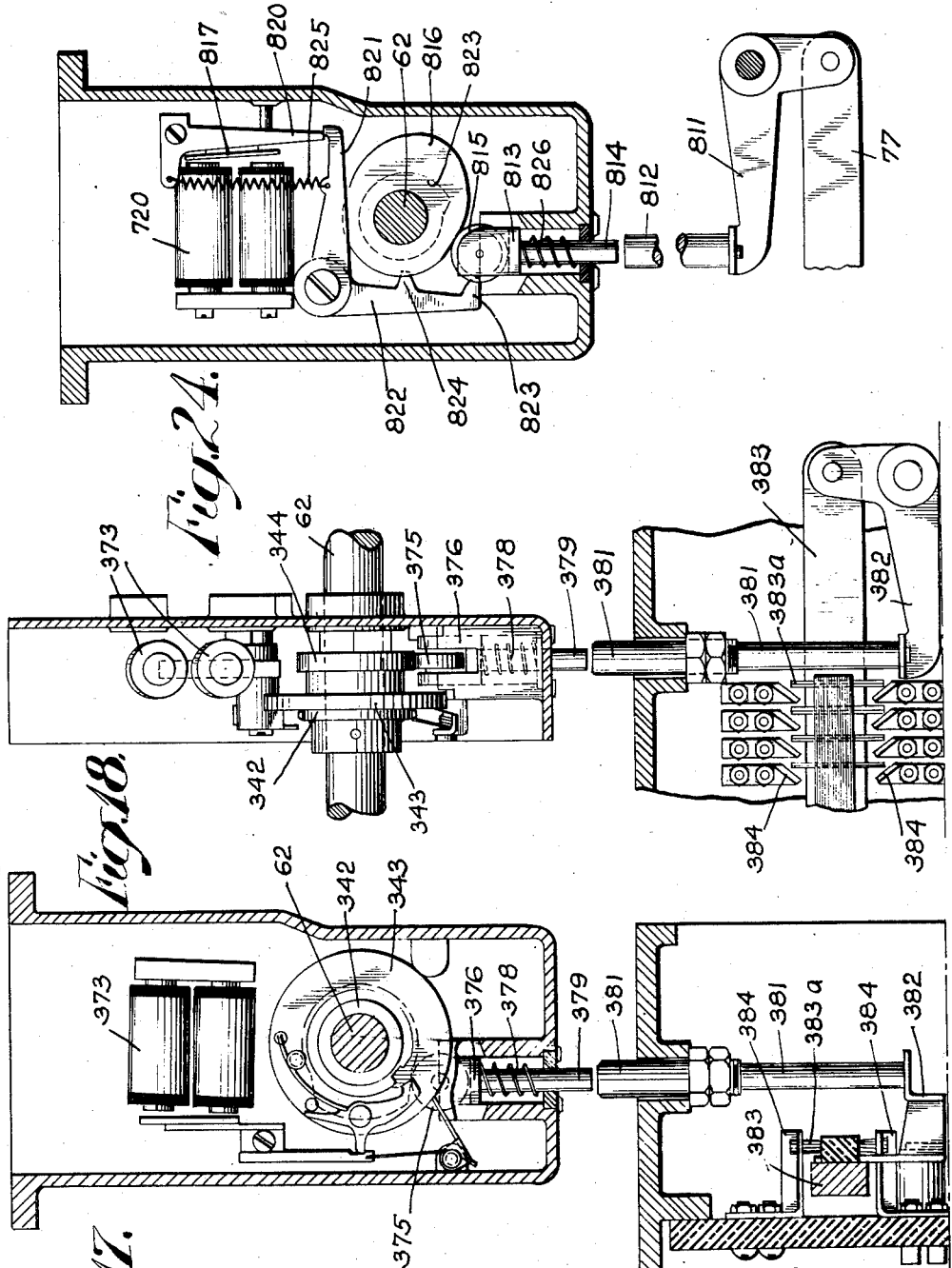

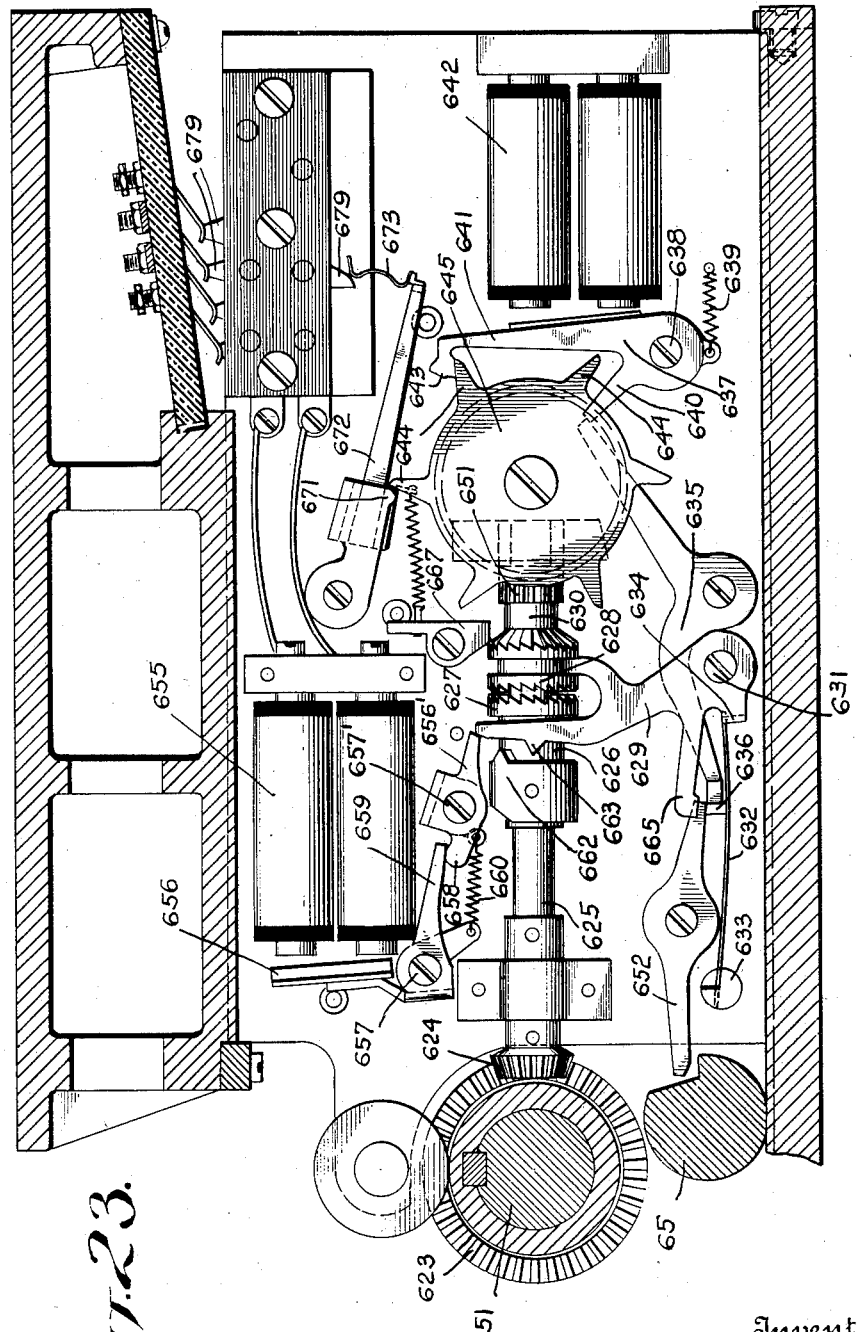

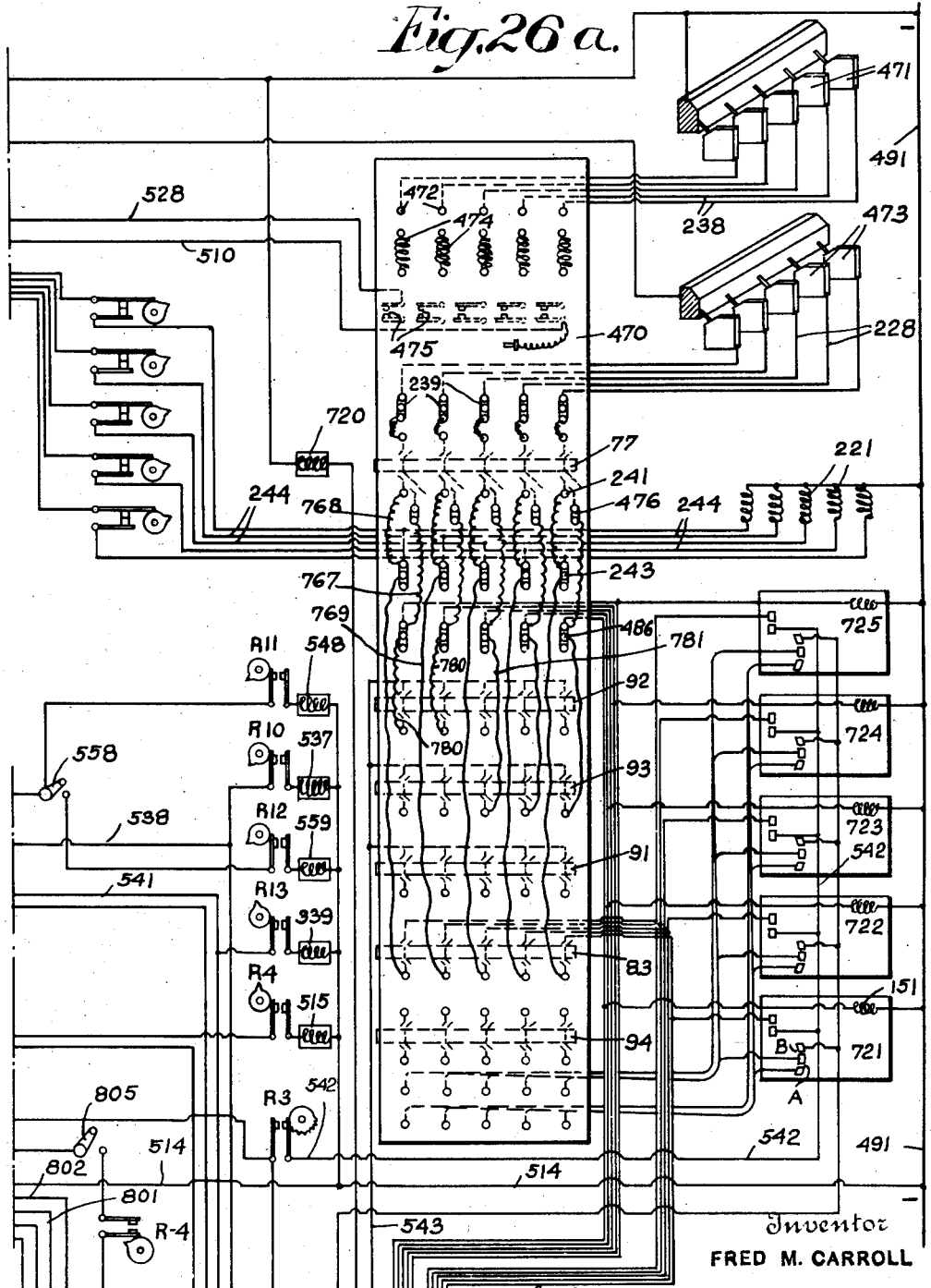

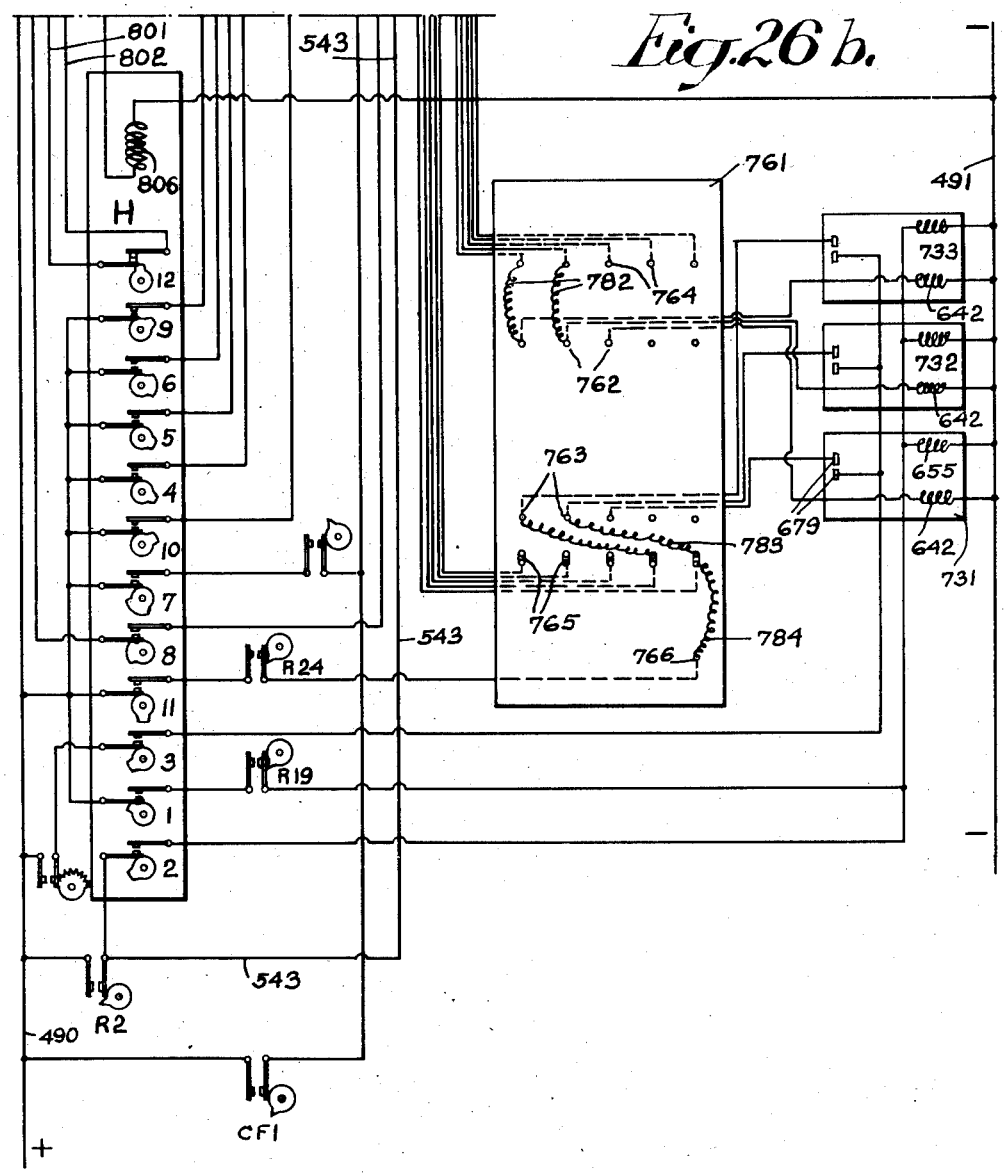

Patented June 7, 1932

1,862,004

UNITED STATES PATENT OFFICE

FRED M. CARROLL, OF YONKERS, NEW YORK, ASSIGNOR TO THE TABULATING MACHINE COMPANY, OF ENDICOTT, NEW YORK, A CORPORATION OF NEW JERSEY

SUBTRACTING TABULATOR

Application filed February 4, 1927. Serial No. 165,818.

The invention concerns accounting machines and more particularly such machines on which items may be subtracted as well as added.

While not limited to such an application the invention has been found to be particularly useful in machines of the printing tabulator type such as that described in my copending application, Serial No. 147,960, filed Nov. 12, 1926 and it will be described in connection with such a machine.

Printing tabulators are controlled in their adding and printing functions by perforated record cards on which data is designated by the differential locations of the perforations in the cards. The record cards are divided into columns and in the case of numerical data each column may be properly punched to represent any figure and a plurality of columns may be chosen for recording items consisting of a plurality of denominational orders. Also different groups of columns may be selected for the recording of different classes of data. For example, in the present embodiment a certain group of columns or card field may be punched to represent debit items and another group punched to represent credit items which are to be subtracted therefrom. The cards are successively and automatically fed through the machine and in passing through it are analyzed and the data represented by their perforations or index points is automatically entered into adding units and accumulated. The printing section of the machine is likewise automatically controlled and may either list each item as the successive record cards are analyzed or print the total of a plurality of items which have been entered into the adding units and accumulated. The machine described in my copending application above referred to is a tabulator of high adding and printing speed in that it makes use of a rotary printer and of great flexibility of operation in that each adding unit is a self-contained operative entity which may be associated at will with any other unit for conjoint operation in tabulating items running into several figures and may be selectively connected with the analyzing mechanism to add the figures designated in any card column. The same flexibility of operation also exits in the printing devices and each of these may likewise be connected to the analyzing mechanism to print items from any card column independently of any adding unit or to any adding unit to print a total accumulated thereon. The present invention contemplates retaining all these features in respect to the adding and printing functions of the machine and in addition providing subtracting mechanism in which similar advantages in speed and flexibility of operation reside.

The principal object of the invention is to provide an automatic subtracting mechanism for accounting machines in which the subtracting mechanism involves new and novel arrangements and construction in its operating elements.

A further object of the invention is to provide for subtracting operations in an accounting machine at operating speeds above those heretofore obtainable.

Another object of the invention is to provide a subtracting mechanism for accounting machines which may be associated at will with any of the adding units of the machine to subtract items entered on the different units.

Another object of the invention is to provide a new and improved construction and arrangement of elements in a subtracting mechanism to permit items to be subtracted and the original items to be retained in the machine.

Another object of the invention is to provide a subtracting mechanism for accounting machines in which the items to be subtracted are entered into separate adding units and the subtrahend items thereafter converted into their complements by subtracting mechanisms and entered into the minuend units for addition.

These and other objects which will become apparent as the description proceeds will be hereinafter explained in connection with a preferred embodiment of the invention.

The principle of operation of the invention consists in entering items which are to be subtracted into separate banks of adding units on which they may be accumulated. It is the totals of the several items on each bank which are subtracted and the subtracting operation conforms somewhat to the well known totaling operations on tabulating machines. It is obvious, however, that the subtraction is not limited to totals of several items but may be effected after a single item of each class has been entered on the adding banks. The subtracting operation involves a number of successive machine cycles and the sequence herein given has been found to function satisfactorily on the mechanism chosen for the disclosure, although it will be understood that the sequence may be varied in this or other structures and that under certain circumstances functions which require separate cycles in the present embodiment may be satisfactorily performed to become effective during the same machine cycle.

The items to be subtracted are first entered into separate adding units and the subtracting operation is thereafter initiated. It may be supposed for the purpose of explanation that debit items have been entered into one bank of adding units and credit items which are to be subtracted therefrom have been entered into another bank. During the first active cycle of the subtracting operation the total of the debit items is printed and the total re-entered or retained on the adding units. In a subsequent cycle the total of the credit items is printed and their adding bank cleared, and coincident with the total and clearing on this bank the nine complement of the total is entered into a subtracting mechanism having units somewhat similar in construction and operation to the adding units. The nine complement is entered into the debit adding units during a subsequent machine cycle and the subtracting units cleared. The units of the credit bank now register the sum of the original credit units and the nine complements of the original debit units which obviously in actual figures represents one unit less than the difference between the original debit and credit units. During a subsequent cycle the required extra unit is entered into the credit bank to make the figures standing on this bank represent exactly the difference between the original credit and debit items. The entry of this extra unit is necessary, because, in these machines, the obtaining of the true complement of a number involves difficulties which would unnecessarily complicate the construction of the machine. It has become the practice to use the nine complement, that is the difference between 9999+ and the item, which is quite easily obtainable and thereafter automatically adding one to the result to obtain the perfect complement. The subtraction operation is terminated by printing the remainder standing on the debit unit and clearing this unit.

The invention as applied to an exemplary embodiment may be understood from the following detailed description, which should be read in connection with the attached drawings in which the same parts are indicated by the same reference numerals throughout the several views and in which Fig. 1 shows a schematic assembly of a complete machine embodying the invention.

Fig. 2 is a detail sectional view of the printing mechanism with an associated adder element.

Fig. 3 is a detail of the mechanism for controlling reset of the adder elements;

Fig. 3a is a view of the mechanism shown in Fig. 3 at right angles to the latter.

Fig. 4 is an elevational view of a complete adder element.

Figure 9:
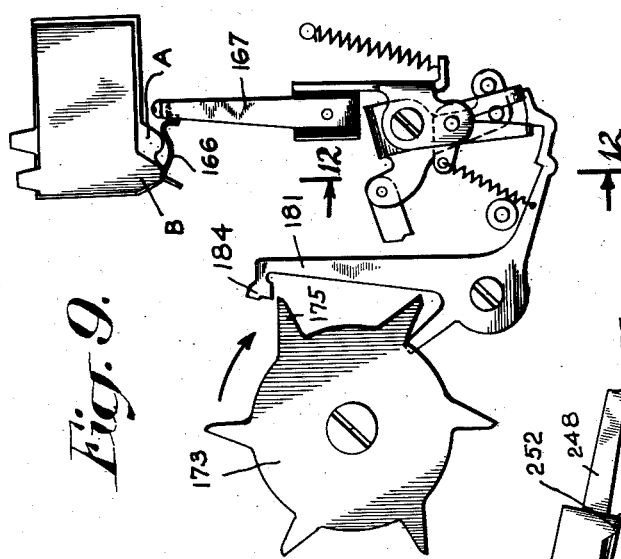
Figure 8:
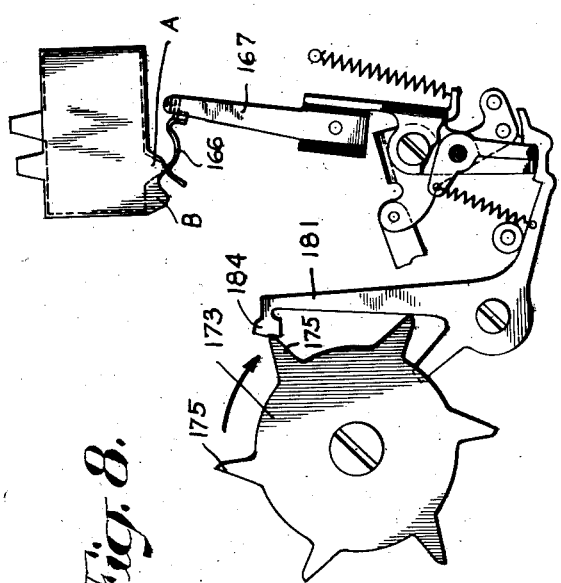

Figs. 5, 6, and 7 are sections on lines 5—5, 6—6 and 7—7, respectively, of Fig. 4, Figs. 8 and 9 are details of the transferring mechanism with the parts in different positions.

Figure 10:
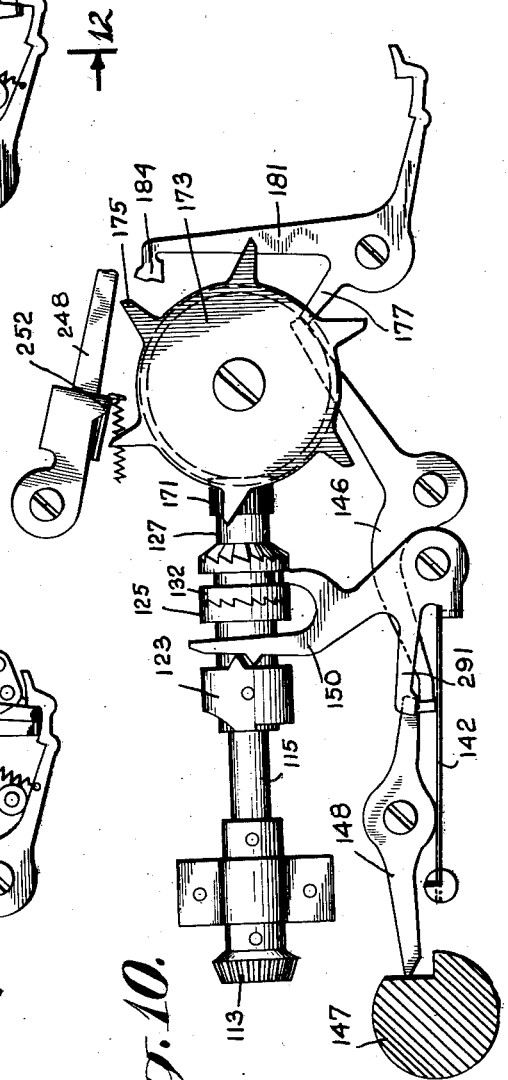

Fig. 10 is a detail of the counter mechanism of an adder element showing the parts in position for resetting on a total printing operation.

Fig. 11 is a detail of the transfer control contacts.

Fig. 12 is a section on line 12—12 of Fig. 9.

Fig. 13 is a detail of the total printing control contacts.

Fig. 14 is a detail similar to Fig. 10 but showing the parts in different positions.

Figs. 15 and 16 are details illustrating the operation of the printing mechanism.

Figs. 17 and 18 are sections at right angles to each other of the switch bar operating devices, the former being along line 17—17 of Fig. 1.

Figs. 19, 20 and 21 are details of one of the automatic timers which control machine operation under certain conditions.

Fig. 22 is a typical cam contact used in the machine.

Fig. 23 is a side elevation of a complete subtraction element.

Fig. 24 is a detail of a special control and operating mechanism for the adding and listing switchbar shown in Fig. 1.

Figure 25:
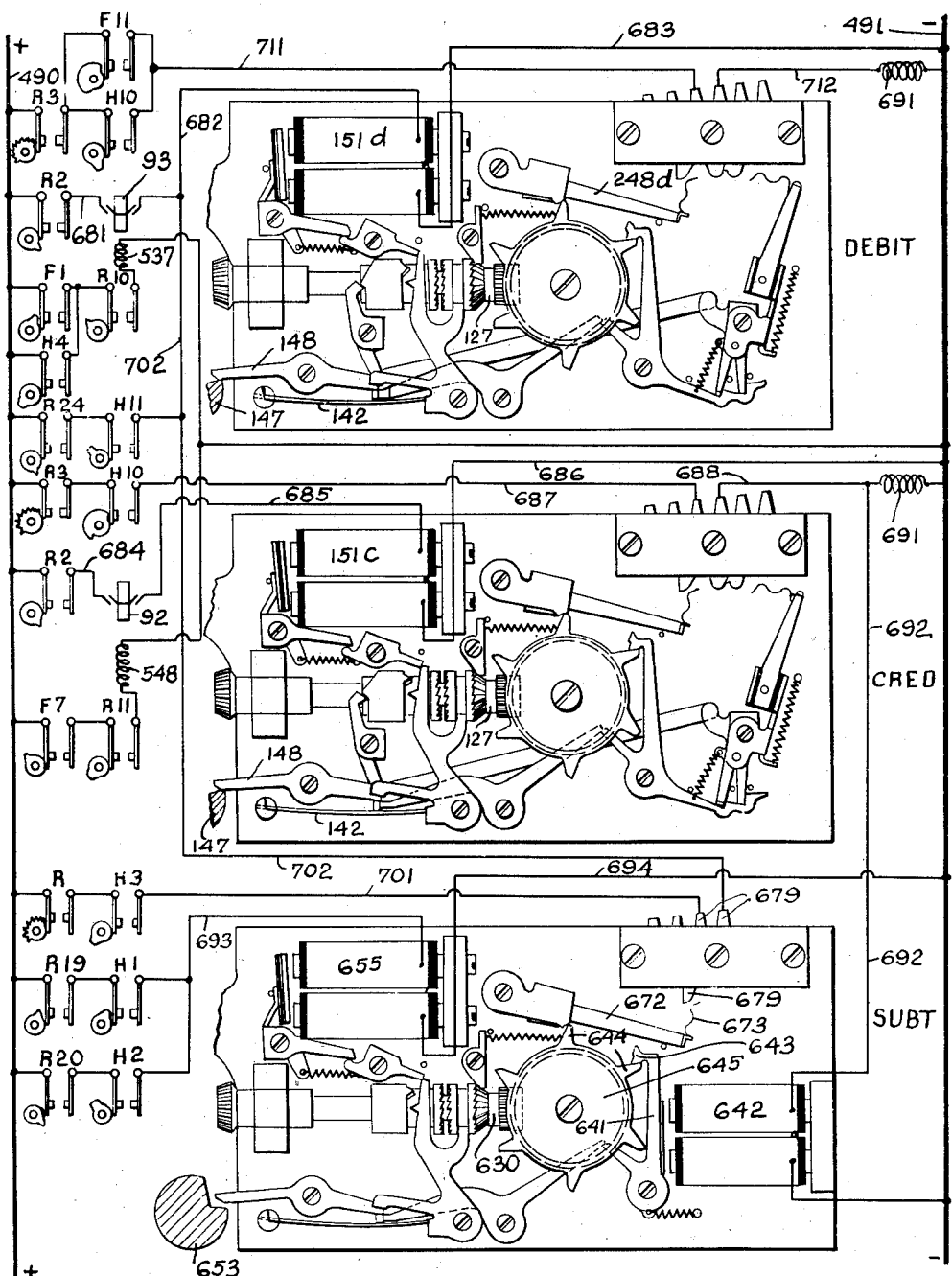

Fig. 25 is a schematic arrangement of a subtraction unit with debit and credit adder units together with the contacts and circuits necessary for a complete subtracting operation.

Figure 26:
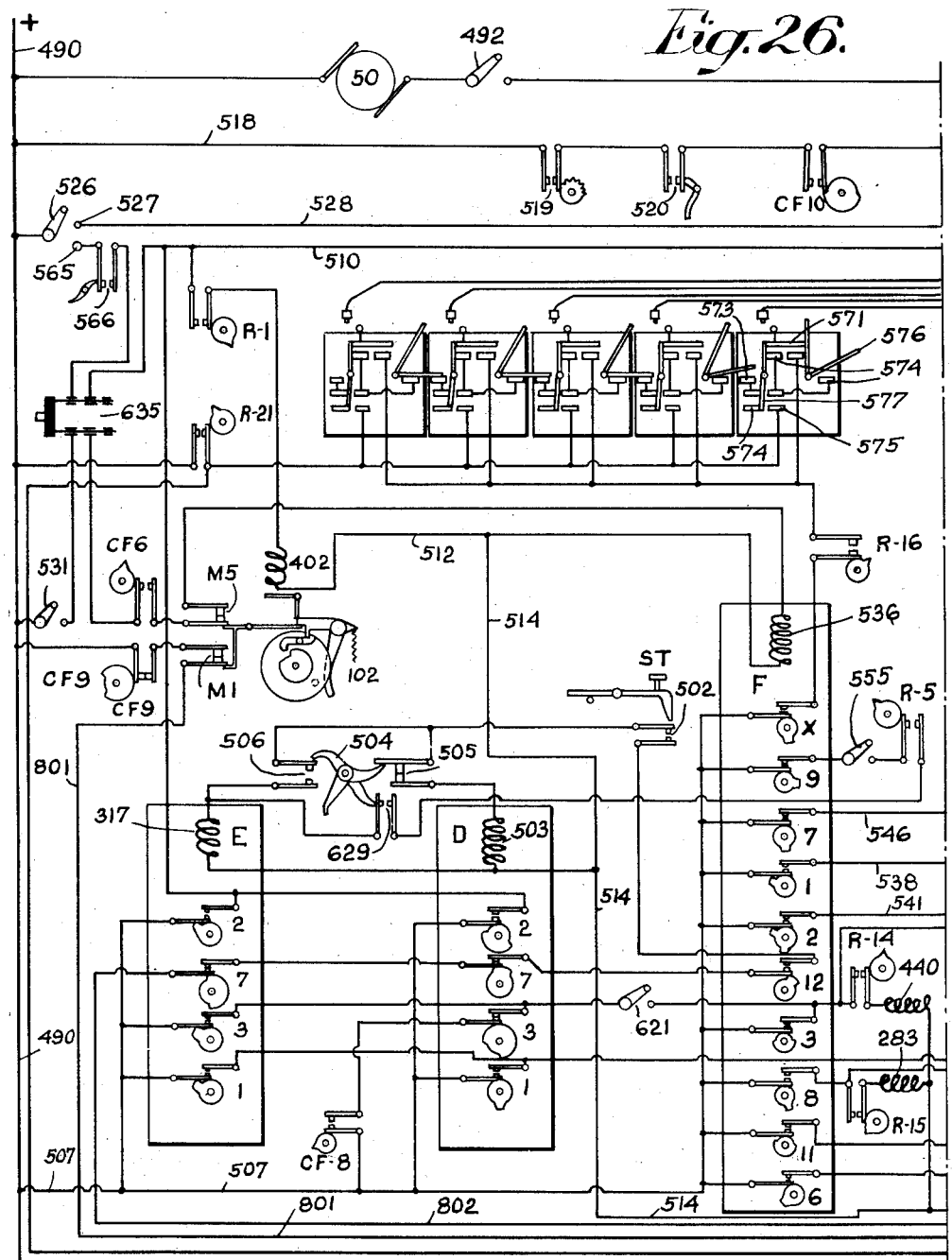

Figs. 26, 26a and 26b are portions of the circuit diagram from which a complete diagram may be formed by placing Fig. 26a to the right of Fig. 26 and Fig. 26b below Fig. 26a.

Referring to Fig. 1 the machine is driven by a motor 50 which through a suitable belt and pulley 53 operates a gear train designated generally at 56. This gear train drives the tabulating shaft 51, the printing drum 54 and the timer shafts 57 and 58, together with the cam shaft 62. All of these shafts and the printing drum rotate constantly as long as the motor is in operation. The platen 55 is rotated intermittently by suitable mechanism to properly feed the paper on which printing is effected, the operating power being obtained from an extension of the gear train 56. The card feed device, indicated gnerally at 100, is operated by the card feed shaft 103 which is connected through a one revolution clutch 102 to a gear train 101 connected to the constantly rotating cam shaft 62. The arrangement and operation of these devices is substantially the same as the arrangement and operation of similar devices in the copending application referred to above and, as they are fully explained in that application, only such features as are essential to an understanding of the present invention will be dwelt upon in the present case.

The only changes necessitated by the subtracting function are the addition of certain subtraction units 52a, operated from the tabulating shaft 51, and of which certain operations are controlled by a link 96a cooperating with a cam on the cam shaft 62, and an extra timer 61a, driven by the shaft 58, and hereinafter referred to as the subtraction timer.

It will be understood that the operation of the motor 50 does not in itself initiate card feed but that the latter must be independently initiated by energizing the card feed clutch magnet 402. Energization of this magnet effects clutching of the one revolution clutch elements and the card feed shaft 103 thereupon makes one complete revolution for each machine cycle and feeds one card into the analyzing mechanism for each revolution. The card feed mechanism ceases operation whenever the magnet 402 fails to be energized during any machine cycle, which will occur either when the cards are exhausted from the magazine or when a card group changes if the machine is operated under automatic control.

The machine is controlled during several initial cycles of tabulating operations and during all the total printing and subtracting cycles by one or more of the timers 59, 60, 61 and 61a. Each of these is essentially a group of cam controlled contacts which open and close according to a predetermined sequence when the timer operates. In Fig. 1 the starting timers or those controlling the beginning of tabulating operations are indicated at 59 and 60 and are operated by the shaft 57. The total timer is indicated at 61 and the subtraction timer at 61a, both of these being operated by the shaft 58. These timers enter into the subtraction operation and one of them will be explained in detail in connection with the illustrations in Figs. 19, 20 and 21 of the drawings. The timer shaft is shown at 301 (Fig. 19) carrying suitably shaped cams 302 which cooperate with pivoted levers 303 (Fig. 20) and cause them to open and close control contacts 304, 305 as required. The driving mechanism for the timer shaft 301 is shown most clearly in Fig. 21. The shaft 301 is driven by a ratchet wheel 306, rigidly attached to it, and a pawl 307. The pawl is mounted on a lever 311 freely supported on a shaft 312 and urged counter-clockwise by spring 315. The lever 311 carries a roller or cam follower 313 which under the force of spring 315 is pressed against the surface of a cam disk 314 fast to the shaft 58. The shaft 58 as will be seen from Fig. 1, makes one revolution for each machine cycle and once each revolution lever 311 will be rocked by the cam. The ratchet wheel 306 is provided with six ratchet teeth and under operating conditions will be advanced the space of one tooth for each revolution of the shaft 58. In other words when the timer is started its shaft 301 will rotate once during six machine cycles. One of the ratchet teeth, designated as 316, is longer than the others and the movement of the pawl 307 is not sufficient to permit it to slide off this tooth and engage the next one and as long as the timer shaft remains in the position shown in the drawings the pawl 307 merely rides up and down on the surface of this elongated tooth.

The operation of the timer is initiated by energizing the magnet 317 (Fig. 20) which thereupon attracts its armature 321 and rocks a latch lever 322 attached thereto from its latching position beneath the arm 324 of a lever 323 freely supported on a stud 312. The lever 323 has a second arm 325 whose end extends into proximity to a cam 326 rigidly mounted on the shaft 58. The arm is ordinarily held out of the path of this cam by the latch 322. A third arm 328 on the lever 323 carries a pivoted pawl 329 and also is attached to the spring 327 tending to rotate the lever about its pivot. The pawl 329 co-acts with a notch 332 in a disc 331 rigidly mounted on the timer shaft. When the lever 323 is in latched position as in Fig. 21 the nose of pawl 327 rests on the brink of notch 332. Energization of the magnet 317, by rocking the latch lever 322, releases the lever 323 and as soon as the cam 326 clears the end of the arm 325 the lever is rocked by the spring 327 and the pawl 329 engages the notch 322. The cam 326 in its next rotation strikes the end of arm 325 and rocks the lever 323 against the force of spring 327, thus imparting a slight rotation to the notched disc 332 and the attached timer shaft 301. The lever 323 is relatched by the latch 322 as the starter magnet 317 has now been deenergized and the position of the starting mechanism is again as shown in Fig. 20. The slight rotation of the timer shaft 301 causes the pawl 307 (Fig. 21) to slip off the surface of the elongated tooth and engage the next tooth of the ratchet 306 whereupon the rocking of the lever 311 by the cam 314 will rotate the timer shaft 301 for one-sixth of a revolution on the pawl 307 engaging each tooth of the ratchet 306. At the end of six cycles or revolutions of the shaft 58 the pawl 307 will again engage the surface of the elongated tooth and as the starting pulse is not supplied at this time it will again ride back and forth on the surface of the tooth 316. The movement of the timer shaft is not an even rotational movement but a series of steps each of which carries the shaft rather quickly through a sixth of a revolution and allows it to remain stationary until the early part of the next machine cycle. The timer shaft 301 is releasably held at the end of each step by an impositive lock consisting of a latch 335 which engages suitably spaced notches 334 in a disc 333 fixed to the timer shaft. The energization of the magnet 317 then has caused the timer shaft to move from its home position through a single revolution back to its home position during six cycles of machine operation. It may be stated, however, that the six steps or cycles of timer operation need not coincide with the usual machine cycles as the point in the machine cycle in which timer operation is initiated may be chosen where most convenient.

The cams 302 are suitably shaped with respect to the particular timer in which they are assembled and the function which is to perform to control the operating circuits of the machine. After the timer has run out its six cycles and has come to rest in its normal position timer contacts 304 and 305 are inoperative until the magnet 317 is again energized to institute another timer operation.

The switch bars 91, 92, 93 and 94 (Fig. 1) are for the purpose of connecting and disconnecting the operative devices of the machine such as the adder or subtraction units from their control elements when necessary. These bars each carry a number of bridging contacts which are normally urged out of engagement with stationary coacting contacts but which are moved into engagement therewith by cams mounted on the cam shaft 62 and enclosed in the jack casings 64, 66, 71, 72 and 73. The operating cam of the adding and listing switch-bar 77 permits it to move into circuit closing position during each machine cycle in which no totaling or subtracting operations occur. When totaling operations take place the total print switch bar 83 moves to circuit closing position and in doing so locks the adding and listing switchbar 77 in open circuit position through the interlocking linkage 85, 86 and 87. When subtracting operations occur the adding and listing switch bar is held out of circuit closing position by a magnet controlled by the subtraction timer as will be explained later.

A typical switchbar with its associated operating jack is illustrated in Figs. 17 and 18 in which the switchbar is shown at 383 and carries a plurality of insulated bridging contacts 383a coacting with stationary contacts 384. The bar 383 is urged into open circuit position by a suitable spring (not shown) but may be moved into closed circuit position by mechanism which will now be described. One arm of a bell crank 382 is pivoted to the end of the switch bar and its other arm is pivoted to a vertical rod 381. Directly above the upper end of rod 381 is the shank 379 of a member 376, which is suitably guided for vertical motion and urged upward by a spring 378 surrounding the shank. The member 376 is provided with upwardly extending ears between which is pivoted a cam follower or roll 375. This cam follower coacts with a cam 344 loosely mounted on the cam shaft 62 and rigidly attached to a disc 343 which forms one element of a one revolution clutch. The other element of the clutch consists of a notched disc 342 pinned to the shaft 62. Energization of the magnet 373 causes the clutch elements to engage for a single revolution in the well known manner and causes the cam 344 to rotate. The high portion of the cam thereupon depresses the member 376 against the action of the spring 378 and the shank 379 depresses the rod 381 and rocks the bell crank 382, forcing the switchbar 383 into circuit closing position. Later in the cycle the cam follower 375 rides to the lower portion of the cam and bar 383 again moves to open circuit position and remains there until the magnet 373 is again energized. The total and group indicating switchbars are of this form just described.

The adding and listing switchbar 77 has operating mechanism of a slightly different form, this operating mechanism being shown in Fig. 24. The bar is normally urged to circuit closing position by a spring (not shown) and is moved out of circuit closing position at times when cards are not actually under the brushes during tabulating cycles by a bell crank 811. The bell crank is actuated by a rod 812 whose upper end lies directly under the shank 814 of a vertically reciprocable member 813. This member carries a cam follower 815 which is urged into engagement with the surface of a cam 816 mounted on cam shaft 62 by a spring 826. Once each cycle, during the active analyzing portion of the cycle, the cam 816 permits the member 813 to rise under the action of spring 826 and the switch bar 77 to move to circuit closing position. At other times in the cycle the cam depresses the member 813 and forces the switch bar to open circuit position. As already explained mechanical linkage is provided to prevent the movement of the adding and listing switchbar to circuit closing position when the total print switchbar is in closed circuit position. It is also necessary to hold the adding and listing position in open circuit position during certain subtracting cycles when the total print switch does not move to circuit closing position and this is effected by the magnet 720 which is controlled from the subtraction timer. The magnet 720 has an armature 817 attached to a pivoted frame bearing a latch arm 820. This latch normally engages an arm 821 as shown in the drawings and holds it against the action of a spring 825 which likewise serves to hold the armature 817 away from the magnet when the latter is unenergized. When the magnet is energized to attract its armature, the latch 820 releases the arm 821, which thereupon rotates slightly counterclockwise under the action of spring 825. An arm 822 rigidly connected to arm 821 likewise moves and a projection 823 thereon engages over the cam follower supporting ears on the member 813 and holds the latter down, preventing the switch bar 77 from moving to circuit closing position during the cycle. At the end of the cycle the high portion of a cam 823 fixed to shaft 62 engages a projection 824 on arm 822 and rocks it together with the arm 821 back into position to be relatched and on this shifting of the levers the latch 820 again engages and holds the arm 821 as shown in the drawings.

As the cards feed through the analyzing mechanism the items represented by their index points are entered into the accumulating or adder elements. An adder element is shown in Fig. 4. The tabulating shaft 51 carries a bevel gear 111 meshing with a bevel pinion 113. The pinion 113 is fixed to a shaft 115 which of course rotates as long as the driving motor is operating. A sleeve 123 is pinned to the shaft 115 and is provided with clutch teeth on its face. Freely mounted on the shaft 115 is a sleeve 127 comprising the counter element of the unit and having clutch teeth on its face adapted to coact with the clutch teeth on the sleeve 123. The sleeve 127 is free to slide on the shaft and is normally urged to clutch engaging position by a pivoted shift lever 150 biased by spring 142 which is tensioned during tabulating operations by a double arm lever 148, having one arm forcing a struck up extension on lever 146 against the spring and the other arm resting against the edge of a notch in rock shaft 147. A latch 158 normally takes under an arm of the shift lever 150 and prevents engagement of the clutch elements. The entry of an item into the unit is initiated by momentary energization of the magnet 151 which attracts its armature 152 and forces an arm 154, mounted on the pivoted armature support, against a tail piece of the latch 158 and rocks the latter from beneath the shift lever 150. The shift lever thereupon, under the action of spring 142, shifts the counter element causing its clutch teeth to engage those on the sleeve 123. The counter element 127 then rotates with the sleeve 123 and the shaft 115 until at a fixed point in the cycle a projection on the sleeve 123 strikes a cam projection 161 on shift lever 150 and cams the latter thereby disengaging the clutch elements. When the lever 150 is thus cammed out the latch 158 again slips under it and holds the clutch elements out of engagement until the magnet 151 is again energized. The operation of the driving mechanism for the adder element is so synchronized with the card feed that the rotational movement of the counter element 127 registers the item represented by the index point on the card.

When one or a plurality of items have been accumulated on the counter element 127, the result or the amount standing on the counter element at any time may be printed. This totaling operation with the present machine may either clear the counter, restoring it to its zero or home position, or permit the total which is printed to remain on the counter. If the printed total is to be retained on the counter element the notched shaft 147 remains in the position shown in Fig. 4 constantly tensioning the spring 142 through the lever 148. Totaling is initiated by energizing the counter magnet 151 which as before through its armature 152 and arm 154 trips the latch lever 158 and allows the shift lever 150 to effect engagement of the counter clutch elements. In this case the energization of the magnet 151 is so timed that the counter element 127 moves exactly 10 tooth spaces or points thereby causing it to pass through its zero position and reenter the item originally standing on it. The kickout is effected by a projection on the sleeve 123 which at the proper time engages the cam projection 161 on the lever rocking it against the action of spring 142 and permitting latch 158 to again engage under the lever 150.

Total printing is initiated as the counter element passes through its zero position. The counter element 127 has elongated gear 171 formed on its end which meshes with a crown gear 172 formed on the rear face of disc 173. As the counter element rotates the disc also rotates. The disc is provided with a plurality of cam projections 175 and the gear ratio is such that the disc rotates through the angular distance between adjacent projections when the counter element moves ten points. Just before the counter element 127 reaches zero position one of the projections 175 engages projection 252 on a pivoted lever 248 and cams the lever upwardly causing a bridging contact 247 to bridge printing control contacts mounted in the insulating block 109 (see Fig. 13). The bridging of these contacts closes a printing control circuit and energizes a printing magnet to select a type for printing corresponding to the item originally standing on the counter element 127, the movement of the type carrying elements being adjusted to the movement of the accumulating mechanism for this purpose.

When it is desired to clear the counter element on a total printing operation the actual printing is effected in the manner just described but in this case provision is made for disengaging the clutch elements of the counter when it reaches zero position. For this operation the notched shaft 147 is rocked to the position shown in Fig. 10 whereupon the lever 148 no longer tensions the spring 142. The spring for the time being is tensioned by the lever 146 which is held in spring tensioning position by an arm 177 integral with lever 181. The operation is initiated as previously by energizing the magnet 151 which permits shifting of the shift lever 150 causing engagement of the counter clutch elements. When the counter element reaches zero position a projection 175 on the disc 173 engages the cam surfaces 184 on the end of lever 181 and rotates the latter clockwise, removing the arm 177 from beneath the lever 146 as indicated in Fig. 14. This relieves the tension on the spring 142 which straightens and forces the struck-up extension on lever 146 against an arm 291 on the shift lever 150, shifting the latter to unclutch the counter element from the driving mechanism just as it reaches zero position; in other words, printing the total which originally stood on it and resetting it to zero.

The device for rocking the notched shaft 147 to the total with reset position is illustrated in Figs. 3 and 3a. A link 96 is pivoted at one end to an arm 273 fixed to the shaft 147 and at the other end to a lever 274. A spring 284 tends to constantly raise the link 96 and rock the shaft 147 to the total with reset position (as illustrated in Fig. 10). The arm 274, however, is normally latched by a pivoted latch 281 held in latching position by an extension 287 carried on the supporting structure of an armature 282 for the magnet 283. Energization of the magnet attracts its armature and releases the latch whereupon the spring 284 raises the link 96 and rocks the notched shaft 147 to the total with reset position. At the end of the cycle a cam 756 on the cam shaft 62 rocks a lever 753 and a pin 758 thereon rocks the lever 274 permitting it to be relatched by the latch 281. This lowers the link 96 and restores the shaft 147 to its normal tabulating position as shown in Fig. 4 where it remains until the magnet 283 is re-energized.

The operation of the adding mechanism for accumulating items and total printing either with or without reset of the adder element has now been briefly explained for a single unit. It will be understood that ordinarily several units are used, each of which is apportioned to a particular denominational order. In this case whenever a counter element in accumulating passes through its zero position one unit must be transferred to the next higher adding element. This transferring operation has been fully disclosed in the copending application above referred to and will not be repeated in detail.

Briefly the transferring is effected by electrical circuits containing gaps at the contacts A and B, (Figs. 4, 8, 9 and 11) which are adapted to be bridged when necessary by bridging contact 166 mounted on arm 167. By a suitable lever system the arm 167 is shifted under control of the disc 173 when the counter element reaches its 9 position by coaction of a projection 175 with the cam surface 184 on lever 181 and shifted a slight additional distance when the counter element reaches zero position. When the counter element is in 9 position contact 166 bridges the contacts A and when it is in zero position the contact 166 bridges the contacts B. The contacts B control the circuit of the counter magnet of the next higher denominational order adding unit and when bridged will cause one unit to be entered into the adding element of this higher unit. The contacts A also close a break in the circuit of the counting magnet of the next higher unit but this circuit also includes in series the contacts B of the next lower unit. When the counter element of a given unit stands at 9 the bridging of the contacts A is of no effect unless the adjacent lower adding element passes through zero during the same machine cycle in which case there will be not only one unit entered into it but also one unit entered into the adjacent higher unit. This double transferring of course, is necessitated by the fact that when an element stands at 9 and one unit is transferred to it moving it to zero an extra unit must be entered into the adjacent higher unit.

The printing mechanism (Figs. 2, 15 and 16) is of the rotary drum type substantially similar to that fully described in my U. S. Patent No. 1,516,079 although the details of the call and control system have been changed in some degree as will be clear from the following description. The printing drum 54 carries a plurality of circumferential rows of type 211 mounted on pivoted carriers 212. Ordinarily one row is provided for each column of the controlling cards and each row contains a type for printing each character which may be represented by the index points in the record columns and additional type for printing special characters which may be desirable under certain circumstances, such as total marks or asterisks. Only one row of type has been illustrated in the drawings but it will be understood that the control and operation of the other rows is identical with that of the single row shown.

A locking cam 213 is provided for each type carrier to hold it positively against rotation about its pivot except when it is in printing position. These cams consist of cylindrical members or disks 213 provided with a notch 214. They are rotated in synchronism with the drum by gear trains (not shown) so that each cam makes one revolution for each revolution of the drum and so that the notch will release the type carrier for possible printing operations whenever it reaches printing position. Each type carrier has a cam surface 215 concentric with the periphery of the cam disk 213 when the carrier is in normal inoperative position. During that portion of the cycle when the carrier is out of printing position the cylindrical surface of the disk 213 rides under the cam surface 215 and holds the carrier firmly against rotation as shown in connection with the left hand type carrier in Fig. 15. When a carrier reaches that position in which rocking about its pivot would cause its type to strike against the platen roll 218, the notch 214 in the locking disk releases the carrier so that it may be rocked about its pivot to cause its type to print.

The printing call mechanism for each row of type is controlled by a printer magnet 221 having an armature 222 provided with an extension abutting a call rod 223 which in turn abuts one arm of a lever 224 and rocks it counterclockwise against the action of the compression spring 225 when the armature is attracted by the magnet. The lever 224 is provided in its oppositely extending arm with a notch 227 which in the absence of a printing operation engages and holds the end of an arm of lever 228 biased for clockwise rotation by a compression spring 229. An oppositely extending arm 230 of lever 228 is provided with a cam surface 231 and carries a dog 232 biased for rotation by a spring 233, the rotation being limited by suitable coacting lugs on the lever arm 230 and the dog. When the parts are in normal non-printing position as shown in Fig. 2 the dog rests against the tip of a lever 234 which carries a finger 236 having a hook 237 at its end for engaging projections 217 on type carriers 212. The lever 234 has a coacting compression spring 235 which ordinarily holds the hook 237 out of the path of extensions 217.

The proper magnet 221 is energized instantaneously to effect printing. The magnet attracts its armature 222 which, through its extension, forces call rod 223 to the right rocking lever 224 about its pivot and releasing lever arm 228 from the notch 227. The lever 228 is rocked by its spring 229 and the biased dog 232 in descending snaps under the lever arm 234 as shown in Fig. 15. Shortly after this the tail projection 217 on a type carrier behind that one which is to print engages the cam surface 231 and forces the lever arm 230 with its pivoted dog 232 upward, rocking lever 234 and forcing the hooked end 237 of finger 236 into the path of the tail projection 217 of the type carrier by which printing is to be effected. The drum in rotating forces the projection sharply against the hook 237 and the impact causes the carrier to turn about its pivot and force the type against the platen roll. A slight additional movement is thereafter imparted to the arm 230 owing to the continuing coaction between the cam surface 231 and the tail piece 217 and the dog 231 slips off the end of arm 234 as shown in Fig. 16 and, as the magnet 221 is now deenergized and its armature released, the end of the arm 228 is again latched in the notch 227. Incidentally the arm 234 having been released by the dog 232 is rocked by its spring 235 to inoperative position. The parts are thus restored to the position shown in Fig. 2 in readiness for a subsequent printing operation.

The drum 54 rotates in synchronism with the feed of the record cards past the analyzing brushes so that for listing each type reaches printing position shortly after its corresponding index point position on a record card reaches the analyzing brush. When a brush encounters a perforation a pulse of current flows through the printing control magnet and sets the operating finger to engage the proper type carrier and cause printing immediately thereafter. The total printing operation is initiated by simultaneously energizing the counter magnets 151 of all accumulators from which total printing is desired shortly before the nine type on the drum reaches printing position. This causes all the counter clutches to engage simultaneously rotating the counter elements and as each of the latter reaches zero position its printing control magnet will be energized. This arrangement always selects the type for printing which represents the item standing on the counter element at the time its clutch engages. For example, if a certain counter element register 7 it must turn through its 8 and 9 positions to reach zero. In the meanwhile the printing drum has successively carried the 9 and 8 type through printing position and the 7 type will be selected as the counter reaches zero.

The mechanism thus far explained is common to the machine disclosed in my copending application Serial No. 147,960 to which reference may be had for a detailed explanation of it. The additional new features by which the tabulator is made capable of subtracting as well as adding will now be described in detail.

Subtracting unit

The subtraction units, one of which is shown in Fig. 23 are similar in general structure and operation to the adding units although certain changes are necessitated by the fact that their function is solely to convert items or totals on certain adding units to the nine complements thereof and to enter these complements into other adding units. The motive power for the subtraction units is also obtained from the constantly rotating tabulating shaft 51 which has an individual bevel gear 623 engaging a pinion 624 fixed on the individual operating shaft 625 of each subtraction unit. The shaft 625 has a sleeve 626 fixed on it, one of whose ends is formed into an enlargement 627 with clutch teeth similar to those on the adding units formed on its face. The clutch teeth on this member co-act with oppositely disposed clutch teeth on an enlargement 628 formed on the sleeve 630 which is freely supported on shaft 625. The sleeve 630 corresponds to the counter element of the adding units although in the subtraction unit this element has no adding functions but merely registers and retains temporarily complements of numbers standing on certain adding units which complements are to be entered into other adding units. The sleeve 630 is slidable on the shaft 625 and is normally urged into clutching engagement with the sleeve 626 by a shift lever 629 pivoted at 631. The shifting force for the lever 629 is obtained from a spring 632 one of whose ends is rigidly fastened at 633 and whose free end engages a struck up portion 634 on the shift lever 629. The spring 632 is tensioned by a lever 635 having oppositely extending arms one of which has an offset extension 636 forced against the spring to tension it under certain conditions. It will be obvious that as long as the spring is tensioned the shift lever 629 tends to constantly shift the clutch elements into engagement with each other to rotate the element 630 with the shaft 625. The lever 637 is pivoted at 638 and biased for counterclockwise rotation by spring 639 and has an arm 640 normally positioned under an arm on the lever 635 holding the extension 636 on the other arm thereof against the spring 632 and normally tensioning the latter. The operating magnet of the unit is indicated at 655 and has an armature 656 pivoted at 657. The shift lever 629 is normally prevented from shifting the clutch members into engagement by a latch 656' pivoted at 657' and having a tail piece 658 positioned in the path of movement of a rocking arm 659 integral with the supporting structure of the armature 656 and adapted to move therewith. A spring 660 urges the armature 656 away from the cores of its magnet and biases the latch 656 into latching position. Energization of the magnet 655 attracts its armature 656 and rocks the arm 659 causing the latch lever 656' to release the shift lever 629 The latter thereupon shifts the clutch elements into engaging position and after they have been so shifted the latch lever 656' is unable to again engage under the arm of the shift lever as the shifting of the latter allows the tip end of its arm to engage the latching lever and hold it out of latching position until the clutch is disengaged. The lever 637 has a second arm 641 which carries an armature for the stop magnet 642 of the unit, and the end of this arm is formed into a cam surface 643 co-acting with the cam projections 644 on a disc 645. The disc 645 is similar in its operation to the disc 173 on the adding units (Fig. 4) and through a suitable crown gear mounted on its rear face and meshing with an elongated pinion 651 on sleeve member 630 is rotated whenever the latter member rotates. The projections 644 are spaced apart so that the disc 645 will move through the angular distance between adjacent ones when the member 630 rotates through ten tooth spaces or points. The tension on the spring 632 will be relieved either by energization of the magnet 642 or engagement of a projection 644 with the cam surface 643, either of these operations rocking the lever 637 and removing its arm 640 from beneath the arm of the lever 635 whereupon the spring 632 will straighten and rock the lever 635 slightly so that the arm 640 may not reengage under it when released by deenergization of the magnet 642 or removal of the cam projection 644 from under the cam surface 643. If the clutch happens to be engaged when the lever 635 rocks under the straightening action of the spring the extension 636 on the lever will be forced against an arm 665 integral with the shift lever 629 and shift the latter, disengaging the clutch, and the element 630 remains in the position in which it happens to be at this time being latched by the latch levers 656' and 667. Whenever the element 630 is rotating then it will be arrested either when the stop magnet 642 is energized to attract its armature and rock lever 637 or when it reaches zero position, owing to the camming action between the cam surface 643 on lever arm 641 and one of the cam projections 644 on disk 645. A more positive clutch kick-out is provided at the zero position similar to that on the adding units and consisting of a projection on sleeve 662 which is fixed to sleeve 626 and which is adapted at the proper point in the cycle to strike a cam projection 663 on shift lever 629 and rock it to positively disengage the clutch. If the tension on the spring 632 is relieved during any cycle it will be retensioned toward the end of the cycle by the pivoted lever 652 which has one arm abutting the struck up portion 636 of lever 635 and another arm coacting with a notched rock shaft 653. Toward the end of each cycle this shaft is rocked causing the notch therein to rotate the lever 652 clockwise. The lever thereupon rocks the lever 635 counterclockwise and the extension 636 is forced against the spring 632 to tension it, while the arm 640 of lever 637 rides under the other arm of lever 635 and maintains the spring 632 tensioned.

The mechanism for rocking the notched shaft 653 is illustrated in Figs. 3 and 3a. The shaft 653 has an arm 751 fixed to its end and a link 752 has one end pivoted to this arm. The other end of the link is pivoted to one arm of the lever 753 fulcrumed at 754 and carrying a cam following roll 755 at the end of its other arm. The cam follower 755 coacts with a cam 756 fixed on the cam shaft 62. On each revolution of the cam shaft the high portion of cam 756 coacting with cam follower 755 rocks the lever 753 against the action of spring 757 and lowers link 752 to rock notched shaft 653, whereupon the edge of the notch therein rocks lever 652 and restores the lever 635 to the position shown in Fig. 23 retensioning spring 632 unless this condition already prevails.

The projections 644 on the disc 645 Fig. 23 also co-act with a projection 671 on a pivoted switch lever 672 carrying a wiper contact 673 at its end which, when the lever 672 is rocked by one of the projections 644, makes wiping engagement with and bridges two contacts 679. These contacts control a break in a circuit which governs the entering of a complement standing on the element 630 into an adding element which operation will be described hereinafter.

Subtracting operation

A clear idea of the subtracting operation may be obtained from Fig. 25 in which is shown a diagrammatic arrangement consisting of two regular adding units designated as the debit unit and credit unit, respectively, and one subtraction unit. It may be assumed that items entered into the credit unit are to be subtracted from items entered into the debit unit. Ordinarily, of course, the subtracting operation will involve a plurality of these units and three units as shown will be selected for each denominational order which is involved in the subtraction. The principle of operation, however, will be clear from the cooperation of the three units shown. The units have been indicated as directly connected by wires which are provided with no disconnecting switches or plugs although it will be understood that in practice, and as will be explained hereinafter, the usual arrangement provides for plugging any of the regular adding units of the machine to any of the subtracting units for correlated operation. Furthermore in this diagrammatic showing some of the contacts have been illustrated several times to avoid complication of the circuits. The debit and credit items are entered from the control cards into their respective units and accumulated and the subtracting operation is performed between the total of said items. It may be assumed then that a number of debit items have been entered into the debit unit during a tabulating operation of the machine and a group of credit items which are to be subtracted therefrom have likewise been entered into the credit unit. Subtracting is controlled jointly by the total timer and by the subtraction timer, the contacts of the former being designated by the letter F followed by a numeral and the contacts of the latter by the letter H followed by a numeral. Wherever point control is necessary in an operation it is effected by regularly operating cam contacts which close instantaneously at the required point in the cycle and which are designated in the drawings by the letter R followed by a numeral.

A subtracting operation is ordinarily initiated by the operation of the automatic total timer and parts of it overlap the usual total taking which is automatically instituted after a group of control cards have been tabulated. The automatic total timer is started in operation at the end of this tabulating operation and in its first active cycle energizes the control magnet 537 of the total without reset switchbar 93, the circuit for this magnet being controlled by the total timer contact F1 and the point control contact R—10. The total without reset switchbar 93 is thereupon moved to circuit closing position and causes the debit unit to print the total standing on its counter element and restore the counter element to its original position. The circuit for energizing the countermagnet of the debit unit for this totaling operation extends from line 490 through point control contact R2 wire 681, switchbar 93 and wire 682 to the counter magnet 151d of the debit unit, thence through wire 683 to the other side of the line 491. During this cycle of course the notched rock shaft 147 remains in the position shown in the figure, constantly tensioning the springs 142 of the adding units. The counter element of the debit unit therefore moves a distance of ten points retaining the original item on it and in passing through zero closes its total printing contacts by means of its switch arm 248d to print the total. The total printing circuit extends through cam contacts R—3, total timer contacts F11 and total print contacts of the debit unit to printer magnet 691. This printing operation is not concerned solely with subtracting and is performed simultaneously on all adding units of the machine which are to print totals standing thereon and re-enter them on their counter elements. During the next active cycle of the subtracting operation the total timer contacts F7 are closed and point control contacts R11 cause energization of the operating magnet 548 of the total with reset switchbar 92 moving the latter to circuit closing position. The countermagnet 151c of the credit unit is thereupon energized through a circuit extending from the wire 490 through point control contacts R2, wire 684 to switchbar 92 thence through wire 685 to countermagnet 151c and through wire 686 to the other side of the line 491. During this cycle the selective rock shaft 147 is rocked to release the lever arms 148 on all the adding units and those connected for totaling and clearing print their totals and clear, and incidentally the credit unit likewise clears and prints its total through a circuit extending from line 490 through contacts R3, subtraction timer contacts H—10, wire 687 to the total printing contacts of the credit unit, which are bridged momentarily when its counter element reaches the zero position, thence through wire 688 to the printer magnet 691 and to the other side of the line 491. In the early part of this cycle the subtraction timer contacts H—1 are closed and the point control contacts R19 energize the operating magnet 655 of the subtracting unit, this energization being timed to start the counter element of the subtraction unit one point behind the beginning of the operation of the counter element of the credit unit. When the credit unit counter element reaches zero and effects printing of the total through the circuit previously traced, a parallel branch of this circuit extends through wire 692 to the stop magnet 642 of the subtracting unit, the energization of which disengages the clutch of the subtracting unit. At the end of this cycle the credit unit will have printed its total and have its counter element restored to zero position while the nine complement of the credit total will be entered on the counter element 630 of the subtracting unit. The entering of the complement into the subtracting unit will be clearer from a specific example. If the counter element of the credit unit originally registered "7" it must move three points or tooth spaces to reach zero, that is it must pass through its 8 and 9 registering positions and move to its zero registering position. The subtraction unit at the beginning of the cycle was in its normal zero position and it was started one point behind the credit unit and arrested when the credit unit reached zero. While the credit unit was passing from the 7 to 8 position the counter element of the subtracting unit remained stationary but while the credit unit was passing from its 8 to 9 position the counter element of the subtraction unit passed from its zero to its 1 position and as the credit unit passed from its 9 to zero position the subtracting unit passed from its 1 to its 2 position. At the end of the cycle then the counter element of the subtracting unit registers 2, which is the nine complement of the 7 originally standing on the credit unit. The complements of other numbers standing on the credit unit may be entered into the subtraction unit in a similar manner. The credit unit has now been cleared and the nine complement of the total standing thereon entered into the subtracting unit.

During the next active cycle the operating magnet 655 of the subtraction unit is again energized through a circuit extending from the line 490 through point control contacts R20 subtraction timer contacts H2 closed during this cycle, wire 693 to the operating magnet 655 thence through wire 694 to the other side of the line 491. The clutch of the subtracting unit thereupon engages and starts to move the counter element 630 forward toward its zero or home position. The counter element of the subtracting unit on reaching zero position rocks the switch arm 672 through a projection 644 on the disc 645 and causes the wiper contact 673 on the switch arm to momentarily bridge contacts 679. At the same time another projection 644 on the disc 645 encounters the cam surface 643 on the end of arm 641 and rocks the latter to relieve the tension on spring 632, whereupon the clutch elements of the subtracting unit disengage leaving its counter element 630 standing in zero position. The momentary bridging of the contacts 679 energizes the counter magnet 151d of the debit unit through a circuit extending from the line 490 through subtraction timer contacts H3, wire 701 to contacts 679, bridged at this time and through wires 702 and 682 to counter magnet 151d, and through wire 683 to the other side of the line 491. The energization of the counter magnet of the debit unit engages its clutch which will kick out after entering the complement standing on the subtracting unit. Thus if 2 were standing on the subtraction unit counter it will move eight points in restoring to zero and during this time the kick-out cam on the sleeve 123 (see Fig. 4) of the debit unit will likewise have moved eight points and will disengage the clutch of the debit unit after two units have been entered therein. At the end of this cycle then the nine complement of the total originally standing on the credit unit has been entered into the debit unit and added to the total originally standing thereon. The sum of these as explained above represents in actual figures one less than the difference between the totals originally standing on the debit unit and credit unit. An additional unit is entered into the debit unit during the next active cycle through a circuit extending from the line 490 through point control contacts R24, subtraction timer contacts H—11 and wires 702 and 682 to counter magnet 151d of the debit unit, thence through wire 683 to the other side of the line 491. The point control contacts R24 are timed with respect to the clutch kick-out cam of the debit unit to permit the entry of one unit only to its counter element. The counter element of the debit unit now registers the difference between the items originally standing on the debit and credit units and this difference should now be printed and the debit unit cleared.

It should be borne in mind that total printing from the debit unit is controlled through the total without reset switchbar 93 and ordinarily totals so printed result in retaining the printed total on the accumulator. This results from the fact that the rock shaft 147 is ordinarily in the position shown in Fig. 4, constantly tensioning the spring 142, when the switchbar 93 closes its contacts to effect totaling. The present total printing is still controlled through the switchbar 93 but in this case the rock shaft 147 is rocked to the position shown in Fig. 10, this being effected by energizing the magnet 283 (Figs. 3 and 3a) from contacts on the subtraction timer as will be explained later. The total printing operation, then, although controlled through the total without reset switchbar is actually a total with reset operation.

During the next active cycle then the total without reset switchbar 93 is again shifted to circuit closing position, its operating magnet 537 in this case being controlled by subtraction timer contacts H—4 and point control contact R10, and the counter magnet 151d of the debit unit is energized for a totaling operation by the point control contact R2 through its energizing circuit extending through the switchbar 93. The counter element of the debit unit is now restored to zero and its switch arm 248d is rocked to bridge its total contacts and the difference standing on this unit is printed through a circuit extending from line 490 through cam contacts R—3 and subtraction timer contacts H—10, wire 711 to the total printing contacts thence through wire 712 to the printer magnet 691 and the other side of the line 491. This concludes the subtracting operation which leaves all the units involved in zero position in readiness for a subsequent operation.

The adding and subtracting units which are chosen for any subtracting operation ordinarily consist of trios comprising one minuend adding unit, one subtrahend adding unit and one subtraction unit as shown in Fig. 25. This arrangement is not essential but ordinarily there should be one subtrahend unit and one subtracting unit for each minuend unit, as if the minuend units are in excess of the subtrahend units a "1" will be printed to the left of the first significant figure of the remainder and zeros will be printed on all units between this "1" and the first significant figure of the remainder. As long as there is one subtrahend unit and one subtracting unit for each minuend unit, however, this 1 is not printed and as the zero printing in the present machine is governed by the printing of a significant figure to the left no zeros will be printed to the left of the first significant figure of the remainder. Each subtrahend unit which stands at zero enters its nine complement or nine into the subtracting unit and such nines are entered from the latter into the corresponding minuend unit. The addition of the minuend items and the subtrahend complements always causes the carrying of one unit to the minuend unit to the left of the first significant figure of the remainder and as all these units stand in the nine position the carrying of this one causes them all to move to zero. If there were more minuend units than subtrahend units one of the former would register this carried one but as long as the minuend units are equal or less in number than the subtrahend units all of them to the left of the first significant figure will be cleared and no unnecessary printing of the zeros will result as there will be no significant figure registered on a unit to the left to effect zero printing. The printed result in this case represents exactly the difference required without undesirable zero printing.

*Panel board system*

Referring now to Figs. 26, 26a and 26b of which Fig. 26a should be placed to the right of Fig. 26 and Fig. 26b should be placed below Fig. 26a to form a complete circuit diagram, the main panel board is indicated at 470 and the subtraction panel board at 761. The flexibility of operation of the machine depends in a great measure on the use of these panel boards which make it possible to correlate any operative element with any control element. The main panel board 470 has sockets 472 to which the contact plates 471 of the upper or control brushes are connected and triple sockets 239 to which the contact blocks 473 of the lower or adding brushes are connected. Between these upper and lower brush sockets is located the automatic control mechanism consisting of magnets 474 and automatic control contacts 475 controlled by the magnets. The operation of this automatic control is well understood and fully described in the U. S. patent to Lake, 1,600,413, September 21, 1926. The magnets 474 may be plugged in series between any upper or lower brushes to control on corresponding card columns and any number of the contacts 475 cooperating with the selected magnets may be connected in series in the automatic control circuit. No plugging for this purpose is shown on the drawings as the operation of this system is sufficiently well known. The printer magnets 221 are permanently wired to triple sockets 243 and the counter magnets 151 of the adding units 721 to 725 inclusive, are wired to triple sockets 486 on the plug board. Also mounted on the plug board are the switch bars wired with suitable sockets to permit them to be plugged to any desired adding unit and printing magnet.

The total printing contacts of the adding units are connected to stationary contacts on one side of the total printing switch bar 83 while the stationary contacts on one side of the switch bars 91, 92 and 93 are permanently connected to the positive side of the line 490. The arrangement of the sockets in connection with the total printing and adding and listing switch bars permits any character of total printing, of which the machine is capable, to be performed in connection with any adding unit. The subtraction units 731, 732 and 733 (Fig. 26b) have their stop magnets 642 connected to sockets 762 on the subtraction panel board 761 and one of their control contacts 679 connected to the sockets 763 of the panel board. On this panel board also are placed sockets 764 permanently connected to one of the total print control contacts of the adding units and sockets 765 connected to the counter magnets of the adding units. A socket 766 connected to one of the subtraction timer contacts is provided to govern the addition of the extra unit which is necessary in subtraction operation performed through the addition of nine complements of numbers. This socket may be plugged to the counter element of any desired adding unit which is selected to record the units order of a difference.

In the plugging arrangement selected the adder units 721, 722 and 723 have been plugged to record units, tens and hundreds respectively, of debit items and adder units 724 and 725 have been selected to record the the units and tens respectively of credit items which are to be subtracted from the debit items. The subtraction units 732 and 733 have been plugged to properly cooperate with the adding units for a subtracting operation. The counter magnet 151 of each adding unit is connected by a suitable jumper 767 to the adding and listing switch bar 77 which in turn is connected to suitable lower brushes to govern the entry of items represented by card perforations into the adding units. The printing magnets 221 are plugged through jumpers 768 to the adding and listing switch bar 77 to permit items entered into the adding units to be listed. The printer magnets 221 are also plugged through jumpers 769 to the total print switch bar 83 for control of total printing by the total printing contacts of the adding units. The counter magnets of the credit units 724 and 725 are plugged through jumper 780 to the total and reset switch bar 92 whereby these units will have their accumulators cleared whenever they print a total. The debit unit magnets 151 are plugged to the total without reset switch bar 93 through jumper 781 as these units when involved in a subtracting operation do not clear on printing a total. The stop magnets 642 of the subtraction units 732 and 733 (Fig. 26b) are plugged through jumper 782 to the total print contacts of the credit adding units 724 and 725 and the control contacts 679 of the subtraction units are plugged through jumper 783 to sockets 765 connected to the counter magnets of the debit adding units. A jumper 784 connects the socket 766 to the counter magnet of the units denominational order of the debit adding units. With this plugging arrangement items sensed by the two lower brushes to the extreme left will be entered into the credit adding units and items sensed by the three lower brushes to the right will be entered into the debit adding units 721, 722 and 723. A subtracting operation will then cause the credit items to be subtracted from the debit items clearing the credit adding units and causing the difference to be printed and retained on the debit adding units.

*General operation*

The operation of the machine will now be explained in connection with Figs. 26, 26a and 26b which should be arranged as described above.

The switch 492 is first closed, energizing the starting motor 50 and causing it to drive the constantly operating parts as explained in connection with Fig. 1. The operation of the motor does not institute card feed which may be done by depressing the start key ST closing the contacts 502 and establishing a circuit through either the D timer or the E timer. The function of these timers is to keep the card feed in operation until the first cards to be tabulated are fed under the upper and lower brushes. The D timer controls initial machine cycles when there are no cards under either set of brushes and the E timer controls when the first card of a new group is under the upper or control brushes, these timers being selected by the card lever 504 which is normally in the position shown in Fig. 26 closing the contacts 505 but which is shifted to an alternative position by a card under the upper brushes to close contacts 506 and 629 and open contacts 505. The circuit of the timer starting coils 317 or 503 is established as follows: from line 490 through card feed contacts CF9 normally closed, contacts M1 closed as long as the card feed clutch is not in operation thence through line 801, subtraction timer contacts H12, wire 802, E timer contacts E7, D timer contacts D7, F or total timer contacts F12 to starting contacts 502. From this point the circuit continues either through the contacts 505 and D timer starting coil 503, common return 514, connected to the negative side of the line 491 or through the contacts 506, E timer start coil 317 and through common return 514 to the negative side of the line 491. The timer and card feed contacts in this circuit are for the purpose of preventing energization of the starter timer coils when cards are feeding or when anyone of the other timers is operating. The two starting timers are necessary because there may be either one cycle or two cycles of machine operation before the automatic control system provides for automatic operation of the machine in accordance with like or unlike cards beneath the upper and lower analyzing brushes. If there is no card under the upper brushes, one machine cycle is required to start the card feed during which the first card will be fed under the upper brushes and another cycle is necessary to feed this first card to the lower brushes and to feed the successive card to the upper brushes. At this point, of course, the machine control is assumed by the automatic control system. If there is a card under the upper brushes when the card feed starts but either no card under the lower brushes or a card having non-corresponding controlling perforations, only one cycle is necessary to feed this first card to the lower brushes and the succeeding one to the upper brushes. The only difference between the D and E timers then lies in the formation of their cams for closing their circuits at different times and maintaining them closed for different periods. The card feed clutch magnet will be energized as follows: from the positive side of the line 490, through wire 507 to either the E timer contact E2 or the D timer contact D2, depending upon which timer operates, thence to the regular cam contacts R1 and through the card feed clutch magnet 402, wire 512 and common return 514 to the negative side of the line 491. Before the selected starting timer runs' out the control of the machine is assumed by the automatic control circuit, this circuit extending from line 490 through switch 526, wire 528 and the series connected automatic control contacts 475, through wire 510 and thence through regular cam contacts R1 to card feed clutch magnet 402 and to the negative side of the line as before. The card feed clutch thereupon remains in operation as long as the card group does not change and the cards feed successively beneath the lower brushes. As the cards pass under the lower brushes the items designated by their perforations may be listed through the operation of the printing control magnets 221 and accumulated by the accumulator units 721 to 725, inclusive. The brushes are energized instantaneously for each index point position on a card through a circuit extending from the positive side of the line 490 through contacts 519, closed instantaneously for each index point position by a dentated wheel cooperating therewith, through lower card lever contacts 520, card feed contacts CF10 to the lower analyzing brushes connected to a common metallic supporting block. When a perforation is encountered by any of the analyzing brushes which are plugged for listing or accumulating, a listing circuit will be established from the analyzing brush through the card perforation to contact plate 473 and a wire 228 to the adding and listing switch bar 77 which as explained closes during every tabulating cycle. When this bar moves to circuit closing position a circuit is established through the proper printing magnet to list from the contact 241 plugged to a proper control magnet socket 243 thence through a wire 244 to the proper printing magnet for listing. The tabulating circuit likewise extends from the analyzing brushes to the sockets 239 and through the switch bar 77 but from this point extends to the sockets 476 and thence through a suitable jumper to a socket 486 permanently connected with one of the counter magnets 151 of the adding units. These circuits are properly established for each card so that the items entered thereon may be listed and accumulated by the selected printer and accumulator. The tabulating and listing operations continue until the card group changes, in which case the circuit extending in series through the perforations of the cards under the upper and lower brushes and an automatic control magnet 474 will fail to make. The automatic control circuit through the control contacts 475 will likewise fail to make at the proper time in the cycle thereby deenergizing card feed clutch magnet 402 whereupon card feed will cease at the end of the cycle. Automatic totaling may be effected at the end of each card group by closing switch 531 whereupon a circuit will be established for the total or F timer starting coil 536 through this switch and one blade of double pole switch 635 to card feed contacts CF6, closed at the proper time toward the end of each card feed cycle, thence through the contacts M5, which are closed when the card feed clutch is disengaged and opened when it is engaged, to the F timer starting coil 536 and through common return 514 to the negative side of the line 491. The F timer thereupon starts operation closing its contacts in the proper sequence to control the different totaling operations. Totaling without reset occurs during the second cycle of total timer operation, the total without reset switch bar 93 being moved to circuit closing position by its magnet 537 during this cycle through a circuit extending from the positive side of the line 490, through wire 507, F timer contact F1 and through wire 538 and regular cam contact R10 through, the jack magnet 537 of switch bar 93 and through common return 514 to the negative side of the line. The contacts associated with the switch bar 93 may be plugged to the operating magnets 151 of those accumulating units which are to print totals without resetting and the magnets so connected will receive their impulse to initiate totaling through regular cam contacts R2, wire 543 and the contacts of switch bar 93.

Total taking with reset of the accumulating units is controlled through the total and reset switch bar 92 which is shifted to circuit closing position during the fourth cycle of timer operation, its operating magnet 548 being energized by a circuit established through the total timer contact F—7 during this cycle. The impulse for initiating this type of total taking is supplied to the accumulator units which are plugged for it through the regular cam contacts R2 wire 543 and contacts of switch bar 92 to the operating magnet of the accumulator units which are to print totals and reset to zero.

When the units are to take totals and reset the notched rock shaft 147 (see Fig. 4) must be rocked to the position shown in Fig. 14 and the control magnet 283 is energized at the proper time by the contact F8 which closes and opens with the contacts F7 controlling the total with reset switch bar. The actual circuit for printing the totals standing on the accumulators is controlled by the total printing switch bar 83 whose control magnet 339 is energized through a circuit extending from the positive side of the line 490 through wire 507, F timer contact F2, wire 541 to regular cam contact R13 and through magnet 339 and common return 514 to the negative side of the line 491. The timer contact F2 is closed with the timer contact F1 as well as with the timer contact F7 so that total printing may be effected either with or without resetting of the accumulating elements.

If subtraction of items standing on different accumulators is desired as in the present case, in which the items standing on an accumulator bank consisting of units 724 and 725 are to be subtracted from items standing on the bank consisting of units 721, 722 and 723, the subtraction operation may be automatically initiated by closing subtraction switch 805 shown in the lower left hand corner of Fig. 26a. This switch connects the subtraction timer starting coil 806 to the total timer contact F6. This total timer contact closes during the second cycle of total timer operation and energizes the H timer starting coil 806 during the third cycle through a circuit extending from the positive side of the line 490, wire 507, contact F6, switch 805, regular cam contacts R4 and H starting coil 806 to the negative side of the line 491. From this point the F timer and the H timer operate concurrently and control the several switch bars on the main panel board so that the subtracting operation will be effected as explained in detail in connection with Fig. 25 of the drawings under the heading "Subtracting operation". It is unnecessary to repeat this explanation in detail as it is identical with that described in connection with Fig. 25 save that in Figs. 26, 26a and 26b the units are plugged through jumpers instead of being directly connected as indicated in Fig. 25. While the subtraction timer is operating it is necessary that the adding and listing switch bar 77 remains in open circuit position, and the mechanical interlock indicated in Fig. 1 is inoperative during certain cycles of operation of the subtraction timer. This switch bar during such cycles is held in open position by its control magnet 720 controlled from a contact H8 which effects an electrical interlock with the H timer during the subtracting cycles.

The subtraction timer contact H9 controls the control magnet 283 for the rock shaft 147 (see Fig. 4) during the final subtraction cycle as explained above. This subtraction timer control is necessary as the difference standing on the debit unit is printed under control of the total without reset switchbar 93 although the debit unit must be restored to zero when the difference is printed.

The paper feed magnet 440 shown in the lower right hand corner of Fig. 26 is controlled conjointly from the timer contacts E3, D3, F3 and H6, the closure of these timer contacts occurring in the proper sequence to space the paper when necessary and to prevent its spacing during blank machine cycles. It is unnecessary to go into this in detail as it is fully explained in the copending application above referred to.

The invention has now been explained with reference particularly to a single subtracting operation but it will be understood that the machine, owing to its universal plug board system, is capable of many other modes of operation. The subtraction operation results in clearing all the counter units directly involved, but if it is desired to retain the items which are subtracted in the machine, it is only necessary to plug extra accumulating units in parallel with those on which the subtraction is effected.

I claim:

1. In an accounting machine, a plurality of accumulators, each provided with individual data entering mechanism, means for controlling said several entering mechanisms for entering data of different classifications into the several accumulators and means controlled by said accumulators for effecting a subtracting operation between data standing on different accumulators said means comprising mechanism for operating one of said accumulators solely in an additive direction for the subtracting operation.

2. In an accounting machine, a plurality of accumulators, each provided with individual data entering mechanism, means for controlling said several entering mechanisms for entering data of different classifications into the several accumulators and means controlled by one of said accumulators for subtracting data standing thereon from data entered into another accumulator said means comprising mechanism for operating said last named accumulator solely in an additive direction for the subtracting operation.

3. In an accounting machine, a plurality of accumulators, each provided with individual data entering mechanism, means for controlling said several entering mechanisms for entering data of different classifications into the several accumulators and means controlled by one of said accumulators for subtracting on another the data standing on the two said means including mechanism for operating the accumulator on which the subtraction occurs solely in an additive direction.

4. In an accounting machine, a plurality of accumulators, each provided with individual data entering mechanism, means for controlling said several entering mechanisms for entering data of different classifications into the several accumulators and means for taking a reading from one accumulator, translating it into a complement and entering it into another to effect a subtracting operation on the last named accumulator.

5. In an accounting machine, a plurality of accumulators including registering elements, individual means for moving the elements of each accumulator in an advance direction for entering data thereon and means automatically controlled by said accumulators for moving the registering elements solely in the same advance direction for effecting an automatic subtracting operation.

6. In an accounting machine, a plurality of accumulators including registering elements, individual means for moving the elements of each accumulator in an advance direction for entering data thereon and means automatically controlled by one accumulator for moving the registering element of a second accumulator solely in the same advance direction for subtracting the data standing on the first accumulator from that standing on the second.

7. In an accounting machine, a plurality of accumulators with actuating mechanism, means to control the actuating mechanisms for entering data of different classification in said accumulators, means controlled by said accumulators for effecting a subtracting operation between the data standing on the accumulators and means for selectively associating the actuating mechanism of any accumulator with any other accumulator for such a subtracting operation.

8. In an accounting machine, a plurality of accumulators with actuating mechanisms, means to control the actuating mechanisms for entering data of different classifications in said accumulators, means adapted to be controlled by one accumulator for subtracting on another the data standing on the two and means for selectively associating said last named means with any accumulator for control thereby and with the actuating mechanism of any other accumulator for the subtracting operation.

9. In an accounting machine, a plurality of accumulating units each individual to a denominational order, means for selectively associating any of said units together for conjoint operation in accumulating items comprising several denominational orders, means adapted to be controlled by one accumulator bank for effecting subtraction between the data standing thereon and the data standing on another bank and selective means for associating said last named means with any formed accumulator banks for subtracting operations therebetween.

10. In an accounting machine, a plurality of accumulating units each individual to a denominational order, means for selectively associating any of said units together for conjoint operation in accumulating items comprising several denominational orders, means adapted to be controlled by one accumulating bank for effecting subtraction between the data standing thereon and the data standing on a second bank, said means comprising means for entering the complement of the data on the first bank into the second bank and selective means for associating said last named means with any formed accumulator banks for subtracting operations therebetween.

11. In an accounting machine, a plurality of accumulating units each individual to a denominational order, a plurality of subtraction control units each also individual to a denominational order and selective means for associating any of said subtraction units to any accumulating unit for control thereby and to any other accumulating unit to control the same for effecting subtracting operations between the data in said accumulating units.

12. In an accounting machine, a plurality of accumulating units each individual to a denominational order and each having individual actuating mechanism, means to control the actuating mechanisms for entering data into said units and means for selectively controlling the actuating mechanism of any unit from any other unit for effecting subtraction of the data entered on any unit from the data entered on any other unit.

13. In an accounting machine, a plurality of accumulating units each individual to a denominational order, a plurality of subtraction units each individual to a denominational order and each comprising control mechanism and entering mechanism and selective means for associating the control mechanism of any subtraction unit with any accumulating unit and the entering mechanism with any other accumulating unit for subtracting operations.

14. In an accounting machine, a plurality of accumulating units, each individual to a denominational order, a plurality of subtracting units each individual to a denominational order and each comprising control mechanism and entering mechanism for entering complements of data entered into the subtraction unit into an accumulating unit and selective means for associating the control mechanism with any accumulating unit and the entering mechanism with any other accumulating unit for subtracting operations.

15. In an accounting machine, a pair of accumulating devices having individual entering mechanism for entering data of different classifications therein, a subtracting device comprising means controlled by one accumulating device for effecting a set up corresponding to an entry in the accumulating device and means controlled by the subtraction device for effecting a set up in the other accumulating device corresponding to the difference between the data originally standing on the two accumulating devices.

16. In an accounting machine, a pair of accumulators having individual entering mechanism for entering data of different classifications therein, a subtraction device comprising means controlled by one accumulator for entering therein the complement of data standing on the accumulator and entering means for entering the complement in the other accumulator to register on the latter the difference between the data originally standing on the two accumulators.

17. In an accounting machine, a pair of accumulating units, a subtraction unit comprising a movable element, and operating means controlled by one of said accumulating units for moving said element in an advance direction to a position corresponding to the data standing on the accumulating unit, additional controlling means for effecting movement of said element to its normal home position and means controlled by said element on reaching normal home position for effecting an entry on the other accumulating unit corresponding to the off-normal position of the movable element.

18. In an accounting machine, a pair of accumulators each with individually operable entering means and means for receiving and accumulating entries therein and means controlled by one accumulator for entering a reading into the other to effect a subtracting operation between totals standing on the two accumulators.

19. In an accounting machine, a pair of accumulators each with individually operable entering means and means for receiving and accumulating items and means for entering the complement of a total standing on one into the other to effect a subtracting operation.

20. In an accounting machine, a pair of accumulators each with individually operable entering means and means for receiving and accumulating items and means controlled by one accumulator for entering the complement of a total standing thereon into the other to effect a subtracting operation.

21. In an accounting machine, a pair of accumulators each comprising means for receiving and accumulating items, means wholly automatically operated by the machine after initiation of operation of the latter for printing and clearing from one of said accumulators only and effecting a set up on the other corresponding to the difference between the totals originally standing thereon and means automatically operated by the machine for thereafter printing the difference.

22. In an accounting machine, a pair of accumulators each comprising means for receiving and accumulating items, means wholly automatically operated by the machine after initiation of operation of the latter for printing the totals standing thereon and means controlled by one of said accumulators on a printing operation for entering a set up into the other corresponding to the difference between the totals originally standing thereon and means automatically operated by the machine for thereafter printing the difference.

23. In an accounting machine, a pair of accumulators each comprising means for receiving and accumulating items, means for printing the total standing on one accumulator, means for printing the total standing on the other accumulator and incidentally entering the complement of the last named total on the first named accumulator to effect a subtracting operation and means for thereafter printing the difference on the first accumulator whereby the data on the accumulators and the difference between the same may be recorded on a common record sheet.

24. In an accounting machine, a pair of accumulators each comprising means for receiving and accumulating items, means for printing the total standing on one accumulator retaining the total in the accumulator, means for printing the total and clearing the other accumulator and incidentally entering the complement of the cleared reading into the other accumulator to effect a subtracting operation and means for thereafter printing the result from the first accumulator and clearing it whereby the data on the accumulators and the difference between the same may be recorded on a common record sheet.

25. In an accounting machine including record controlled means for determining machine operation in accordance with data on the records, a plurality of accumulating banks subtracting mechanism for subtracting items accumulated on the banks and means controlled in accordance with a change of machine operation for initiating operation of said subtracting mechanism.

26. In an accounting machine comprising record controlled means for governing machine operation in accordance with group designating data on the records, a plurality of accumulators each comprising means for receiving and accumulating items subtracting mechanism for subtracting the totals of items accumulated on the accumulators and means for automatically initiating operation of said subtracting mechanism on a change in the record group of the controlling records.

27. An accounting machine as in claim 26 in which means is provided for automatically resuming accumulating on the succeeding record group at the termination of the subtracting operation.

28. In a cyclically operable record controlled subtracting tabulator comprising a plurality of accumulators, automatic means operated completely by the machine for effecting subtracting operations between data standing on different accumulators and an automatic control system for sequentially predetermining machine operation through a plurality of cycles during the subtracting operation.

29. In an accounting machine, a plurality of accumulators, total taking mechanism for normally taking totals with clearing said accumulators, means for effecting subtraction between totals standing on said banks, and means for automatically changing the nature of the total taking on one bank to cause it to take a total and retain its reading during a subtracting operation.

30. In an accounting machine, a plurality of accumulators each comprising means for receiving and accumulating items, total taking means and means controlling said accumulators on total taking to effect totaling on one accumulator while retaining the total thereon means for effecting a subtraction operation and means effective during a subtracting operation for taking a total and restoring said accumulator.

31. In an accounting machine comprising total taking mechanism and subtraction mechanism, an accumulator and control means for said total taking mechanism for normally effecting totaling without reset on said accumulator and means controlled by the subtraction mechanism for effecting reset of said accumulator on a totaling operation during subtraction.

32. A subtraction unit for an accounting machine comprising an element rotatable in an advanced direction for entering data therein, means for completing a cycle of operation of the rotatable member for manifesting the complement of the data entered thereon and means controlled by said element on reaching normal position for reading out the complement.

33. A subtraction unit for an accounting machine comprising a movable element for receiving and registering entries, an electromagnet for controlling the starting of said element, a second electromagnet for controlling the stopping of said element to enter data thereon and means controlled by the position of the element for reading out data standing thereon.

34. A subtraction unit for an accounting machine comprising a rotatable element, driving means therefor, electromagnetic means for starting and stopping the element to enter data thereon and means controlled by the element on reaching home position after an entry has been made thereon for reading out the entry.

35. In an accounting machine, a pair of accumulators each comprising means for receiving and accumulating items, machine operated means for automatically effecting a complete subtracting operation between the totals standing on the accumulators and machine controlled means for automatically initiating operation of said machine operated means.

In testimony whereof I hereto affix my signature.

FRED M. CARROLL.